US012245052B2

(12) United States Patent
Narasimha Swamy et al.

(10) Patent No.: US 12,245,052 B2
(45) Date of Patent: Mar. 4, 2025

(54) REINFORCEMENT LEARNING (RL) AND GRAPH NEURAL NETWORK (GNN)-BASED RESOURCE MANAGEMENT FOR WIRELESS ACCESS NETWORKS

(71) Applicant: Intel Corporation, Santa Clara, CA (US)

(72) Inventors: Vasuki Narasimha Swamy, San Francisco, CA (US); Hosein Nikopour, San Jose, CA (US); Oner Orhan, San Jose, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 651 days.

(21) Appl. No.: 17/483,208

(22) Filed: Sep. 23, 2021

(65) Prior Publication Data
US 2023/0093673 A1 Mar. 23, 2023

(51) Int. Cl.
  *H04W 24/02* (2009.01)
  *G06N 3/045* (2023.01)
  *G06N 3/08* (2023.01)

(52) U.S. Cl.
  CPC ............ *H04W 24/02* (2013.01); *G06N 3/045* (2023.01); *G06N 3/08* (2013.01)

(58) Field of Classification Search
  CPC .......... H04W 24/02; G06N 3/045; G06N 3/08
  See application file for complete search history.

(56) References Cited

U.S. PATENT DOCUMENTS

| 11,916,754 | B2* | 2/2024 | Zhu | H04L 41/145 |
| 2017/0293269 | A1* | 10/2017 | Sharma | G05B 13/028 |
| 2019/0238421 | A1* | 8/2019 | Kolar | H04L 43/08 |
| 2019/0239100 | A1* | 8/2019 | Pandey | H04W 24/04 |

(Continued)

FOREIGN PATENT DOCUMENTS

| CN | 115866610 | 3/2023 |
| EP | 3869847 A1 | 8/2021 |

(Continued)

OTHER PUBLICATIONS

Bacon, Pierre-Luc, "The Option-Critic Architecture", arXiv:1609.05140, (Dec. 3, 2016), 9 pgs.

(Continued)

*Primary Examiner* — Adam D Houston
(74) *Attorney, Agent, or Firm* — Schwegman Lundberg & Woessner, P.A.

(57) ABSTRACT

A computing node to implement an RL management entity in an NG wireless network includes a NIC and processing circuitry coupled to the NIC. The processing circuitry is configured to generate a plurality of network measurements for a corresponding plurality of network functions. The functions are configured as a plurality of ML models forming a multi-level hierarchy. Control signaling from an ML model of the plurality is decoded, the ML model being at a predetermined level (e.g., a lowest level) in the hierarchy. The control signaling is responsive to a corresponding network measurement and at least second control signaling from a second ML model at a level that is higher than the predetermined level. A plurality of reward functions is generated for training the ML models, based on the control signaling from the MLO model at the predetermined level in the multi-level hierarchy.

20 Claims, 26 Drawing Sheets

(56) References Cited

U.S. PATENT DOCUMENTS

| | | |
|---|---|---|
| 2020/0139973 A1 | 5/2020 | Palanisamy et al. |
| 2020/0364580 A1 | 11/2020 | Shang et al. |
| 2021/0241090 A1* | 8/2021 | Chen .................... H04W 24/02 |
| 2022/0027792 A1* | 1/2022 | Cummings ............ G06N 20/00 |
| 2022/0046386 A1* | 2/2022 | Sundararajan ........ G01S 5/0252 |
| 2022/0124543 A1* | 4/2022 | Orhan .................... G06N 3/006 |
| 2022/0400373 A1* | 12/2022 | Zhu ......................... H04W 8/24 |
| 2023/0041074 A1* | 2/2023 | Moradi ................. G06N 20/00 |
| 2023/0064266 A1* | 3/2023 | Krishnan .............. H04W 24/02 |
| 2023/0075276 A1* | 3/2023 | Zhu ....................... H04W 88/08 |
| 2023/0093673 A1* | 3/2023 | Narasimha Swamy ................... H04L 41/145 455/446 |
| 2023/0109711 A1* | 4/2023 | Kudva ................... G06N 20/00 706/12 |
| 2023/0309031 A1* | 9/2023 | Haddadin .............. G06N 3/092 |
| 2023/0370338 A1* | 11/2023 | Shori .................... H04L 41/147 |
| 2023/0388196 A1* | 11/2023 | Mozaffari ............... H04L 41/16 |
| 2024/0112010 A1* | 4/2024 | Jain ......................... G06N 5/01 |
| 2024/0202574 A1* | 6/2024 | Atawia ................. G06N 20/00 |
| 2024/0256863 A1* | 8/2024 | Chen ...................... G06N 3/08 |
| 2024/0320505 A1* | 9/2024 | Balakrishnan ........... G06N 3/08 |

FOREIGN PATENT DOCUMENTS

| | | |
|---|---|---|
| WO | WO-2020152389 A1 | 7/2020 |
| WO | WO-2024092635 A1 * | 5/2024 |
| WO | WO-2024097912 A1 * | 5/2024 |
| WO | WO-2024134661 A1 * | 6/2024 |
| WO | WO-2024160359 A1 * | 8/2024 |

OTHER PUBLICATIONS

Florensa, Carlos, "Stochastic Neural Networks for Hierarchical Reinforcement Learning", arXiv:1704.03012, (Apr. 10, 2017), 17 pgs.

Fox, Roy, "Multi-Level Discovery of Deep Options", arXiv:1703.08294, (Oct. 5, 2017), 19 pgs.

Peng, Xue Bin, "MCP: Learning Composable Hierarchical Control with Multiplicative Compositional Policies", arXiv:1905.09808, (May 23, 2019), 18 pgs.

Richard, S Sutton, "Between MDPs and semi-MDPs: A framework for Temporal Abstraction in Reinforcement Learning", Artificial intelligence, 112(1), http: wwwanw.cs.umass.edu -barto courses cs687 Sutton-Precup-Singh-AIJ99.pdf., (Dec. 1, 1998), 181-211.

"European Application Serial No. 22192006.9, Response filed Sep. 5, 2023 to Extended European Search Report mailed Jan. 27, 2023", 8 pgs.

"European Application Serial No. 22192006.9, Extended European Search Report mailed Jan. 27, 2023", 12 pgs.

Li, Yuxi, "Deep Reinforcement Learning", arxiv.org, Cornell University Library, 201 Olin Library Cornell University Ithaca, NY 14853, (Oct. 15, 2018), 150 pgs.

* cited by examiner

REINFORCEMENT LEARNING (RL) AND GRAPH NEURAL NETWORK (GNN)-BASED RESOURCE MANAGEMENT FOR WIRELESS ACCESS NETWORKS

TECHNICAL FIELD

Various embodiments generally may relate to the field of wireless network management, including reinforcement learning (RL) and graph neural network (GNN)-based resource management for wireless access networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Further enhanced operation of wireless access networks, including LTE and NR-based access networks operating in the licensed as well as unlicensed spectrum, is expected in future releases and higher generation systems (e.g., 5G, 6G, etc.). Such enhanced operations can include techniques for RL and GNN-based resource management for wireless access networks.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1:
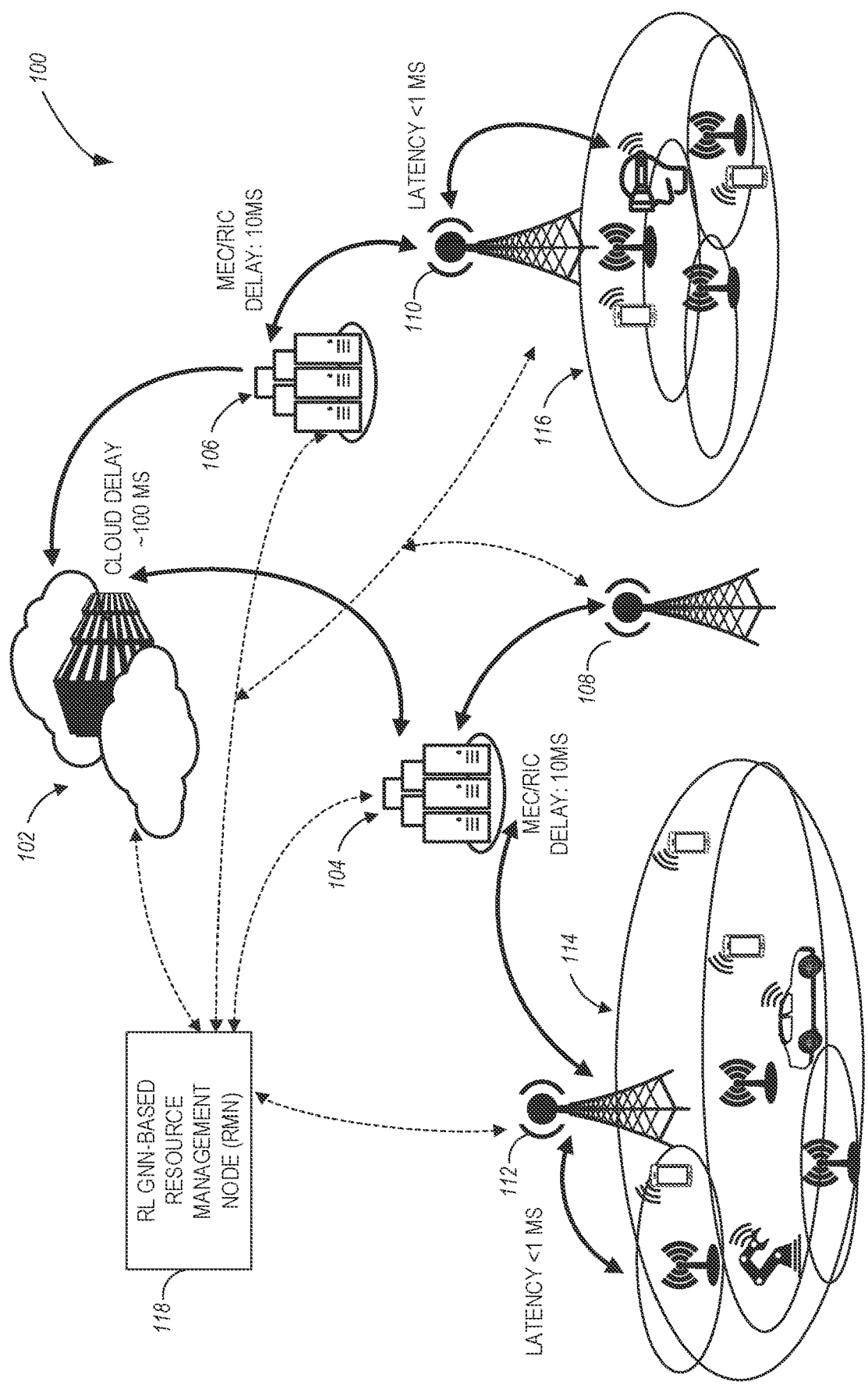
FIG. 1 illustrates an exemplary wireless access network with RL and GNN-based resource management performed by a resource management node (RMN), according to some example embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments outlined in the claims encompass all available equivalents of those claims.

Next generation (NG) wireless network architectures are envisioned to be composed of at least three main control loops: a control loop using a non-real-time radio access network (RAN) intelligence controller (Non-RT RIC) (with associated latencies >1 s), a control loop using a near real-time RAN intelligence controller (near-RT RIC) (with associated latencies of 10 ms-1 s), and a control loop using a real-time intelligence controller (RIC) (with associated latencies <10 ms). In some aspects, the control loops run in parallel and, depending on the use case, may have interactions with each other. In some aspects, the control loops can conflict with each other leading to sub-optimal or unstable network management. Although joint optimization and management of network resources have been investigated before, artificial intelligence (AI) and machine learning (ML) methods can potentially bring lower complexity solutions with better performance. The disclosed techniques may be used for the management of network functions with different time scales. In other words, network functions may be configured to operate in a hierarchy over multiple time scales. Following disclosed techniques, hierarchical reinforcement learning may be used over multiple time scale with joint optimization over network functions. The proposed techniques may include defining intrinsic targets and rewards for lower-level agents from higher-level agents. Additionally, the disclosed techniques may include composing skills (or policies) of multiple agents (e.g., base stations or cells) to achieve better network performance.

Additionally, the disclosed techniques further define a neural network architecture that considers collaboration among the entire network nodes including devices and base stations. In some aspects, a graph neural network (GNN) framework may be used to capture wireless networks. The disclosed techniques are discussed in connection with a heterogenous wireless radio access network with multiple types of nodes such as at central units (CUs), distributed units (DUs), and radio units (Rus). These functions can interact with interfaces defined between them. Each logical function of the wireless network may be represented as a node and each interface as an edge in a graph. Representing a wireless network as a graph allows for the extraction of relevant features from network logical entities using GNN tools such as graph convolutional neural network, spatial-temporal neural network, etc. These tools can learn hidden spatial and temporal features of the wireless network with different scales and configurations without significant performance loss compared to optimal solutions. In addition, a GNN may be used to model entire (very large scale) heterogenous and/or irregular networks and enable scalable local processing. In some aspects, the disclosed techniques use the GNN architecture as a suitable tool to (a) provide scalable optimization/adaptation solutions; (b) model infrastructure where modeling is not accurate or not available; and (c) facilitate joint optimization of multi-layer and multi time scale access networks.

In some aspects, a wireless network has multiple time scale control loops. These loops currently operate independently and with different objective functions, which may lead to unstable and inefficient network operations. The disclosed techniques may be used to define a unified control framework for a multi-time scale wireless network with a common multi-dimensional objective function. The disclosed techniques may be used to optimize and design a resilient network when there are multiple levels of hierarchy including multiple time scales and control loops. The disclosed techniques further identify the signaling and architecture requirements. Additionally, the disclosed techniques further describe how to map network nodes to a graph, how to form the graph adjacency matrix with different types of nodes using RAN information, and what kind of RAN information may be used for configuring wireless networks for a target optimization problem.

Emerging vertical applications such as the Industrial Internet of Things (IIoT), extended reality (XR), and autonomous systems impose stringent communication and computation requirements on infrastructures serving them to deliver seam-less, real-time experiences to users. Cloud computation (as opposed to local, on-device computation) is typically used to support the large computational requirements of these applications. However, the communication latency to the computational cloud server can potentially be very large, resulting in negative user experiences. To holistically address the issue, the network supporting the connection between the user-end devices and the cloud server needs to be reliable, high-throughput (data rate), low latency, and resilient to environment dynamics. Hence, the radio network may be enhanced in parallel or jointly with compute and communication resources to fulfill the new requirements for the emerging applications. Additionally, next generation cellular networks are transitioning from inflexible hard-wired networks to disintegrated architecture to software-enabled and virtualized open networks. For example, typically, front-end and back-end device vendors and carriers have worked closely to ensure compatibility. The flip side of such a working model is that it becomes difficult to plug-and-play with other devices which constrains network improvements. In some aspects, to combat this and to promote openness and inter-operability at every level, RAN disaggregation may be introduced.

In some aspects, macro base stations may provide cellular radio connectivity for devices. Some of the typical issues of macro base station networks include coverage holes, call drops, jitter, high latency, and video buffering delays. These issues are undesirable for resilient network applications. To address such connectivity issues, an intelligent and network-level approach may be used to optimize and manage network resources in place of disaggregated and sub-optimal solutions. In the disclosed techniques, an artificial intelligence-based framework may be used to configure network-level optimization frameworks. These frameworks incorporate the structure of wireless networks into hierarchical reinforcement learning and spatial graph-based neural network.

FIG. 1 illustrates a wireless access network 100 with RL and GNN-based resource management performed by a resource management node (RMN), according to some example embodiments. Referring to FIG. 1, the wireless access network 100 includes network entities (e.g., network nodes) associated with different control loops of varying latencies. For example, the wireless access network includes cloud network entities 102 associated with cloud latency of approximately 100 ms. The cloud network entities 102 are in communication with multi-access edge computing (MEC)/ RIC network entities 104 and 106 associated with a network latency of approximately 10 ms. The MEC/RIC network entities 104 and 106 are in communication with network entities 108, 110, 112, 114, and 116 associated with a network latency of approximately <1 ms. The cloud network entities 102 may use a control loop associated with a non-RT RIC. The network entities 104 and 106 may use a control loop associated with a near-RT RIC. Network entities 108, 110, 112, 114, and 116 may use a control loop associated with a RIC.

In some embodiments, the wireless access network 100 includes one or more RL GNN-based resource management nodes (RMNs) such as RMN 118. RMN 118 may be configured to perform one or more of the disclosed functionalities and techniques associated with resource management within the wireless access network 100.

In some aspects, the control loops of the wireless access network 100 may run in parallel and depending on the use case may have some interactions with each other. In some cases, these loops can conflict with each other leading to sub-optimal or unstable network management. For example, non-real-time network control can be responsible for slicing the network, near real-time network control can be responsible for connection management and carrier aggregation, and the real-time controller can be responsible for user scheduling, HARQ, and beam tracking as indicated in Table 1 below. In this example, a failure in beam tracking will have an impact on network slicing which could potentially be overlooked in traditional network management, leading to sub-optimal solutions. However, when network functions in each control loop are jointly optimized and trained (e.g., using the disclosed techniques), the communication system becomes more resilient to failure and unforeseen events. Therefore, in a hierarchal reinforcement learning framework, an optimization framework may be used for joint management of closed control loops of wireless access networks. The closed control loops in a wireless network can be summarized as follows:

(a) Non-Real-time Control Loop: Non-real-time control loop operates on a timescale of at least one second. This control loop manages the orchestration of radio and network resources at the infrastructure level. This control loop is also responsible for making decisions and applying policies that impact thousands of devices.

(b) Near Real-time Control Loops: Near real-time control loops operate on a timescale between 10 ms and 1s. They run between two components of the Next Generation Node base stations, namely, the central unit (CU) and the distributed unit (DU). This control loop can make decisions affecting hundreds or thousands of UEs, leveraging Medium Access Control (MAC)/ physical layer (PHY) key performance indicators (KPIs).

Real-time Control Loops. Real-time control loops operate on a time scale of less than 10 ms. Such loops may operate between the DU and the radio unit (RU), or at the UEs.

TABLE 1

| Name | Control Loop Time Scale | Network Size | Problem and Goal | Measurements |
|---|---|---|---|---|
| Management and orchestration | Offline | 1000000s of UE, 1000s of BSs | Deployment: Macro cells, sectorization, small cells, Transmitter power, antenna tilt, frequency planning | N/A |
| Non-real time | 1 second or more | 100000s of UE, 100 s of BSs | Cell on/off decision and net topology (in case of IAB) Cell DRB configuration and QoS to DRB mapping Cell CA configuration and CCs allocations Cell ICI/eICC configuration Cell beam coordination (long term) | Any central unit, distributed unit, and radio unit measurements Any UE measurements Any network-level measurements such as location, status reports, etc. |
| Near-real time | 10 ms- 1 ms | 1000s of UE 10s if BSs | QoS priority handling policies for multiple DRBs UE connection and mobility management UE CA configuration and SCC set allocation and HO UE multi-connectivity config UE packet duplication per QoS UE traffic steering | Any central unit, distributed unit, and radio unit measurements Any UE measurements |

TABLE 1-continued

| Name | Control Loop Time Scale | Network Size | Problem and Goal | Measurements |
|------|------------------------|--------------|------------------|--------------|
| | | | for multi-connectivity UE semi-persistent scheduling configuration per QoS | |
| Real-time | <10 ms or every TTI | 10s of UE A few BSs | Coordinated and distributed MAC scheduling and UE beam/power allocation CA aware UE scheduling and SCC allocation per UE MAC QoS-aware UE scheduling & mMIMO UE pairing | Any distributed unit, and radio unit measurements Any UE measurements |

Figure 2:
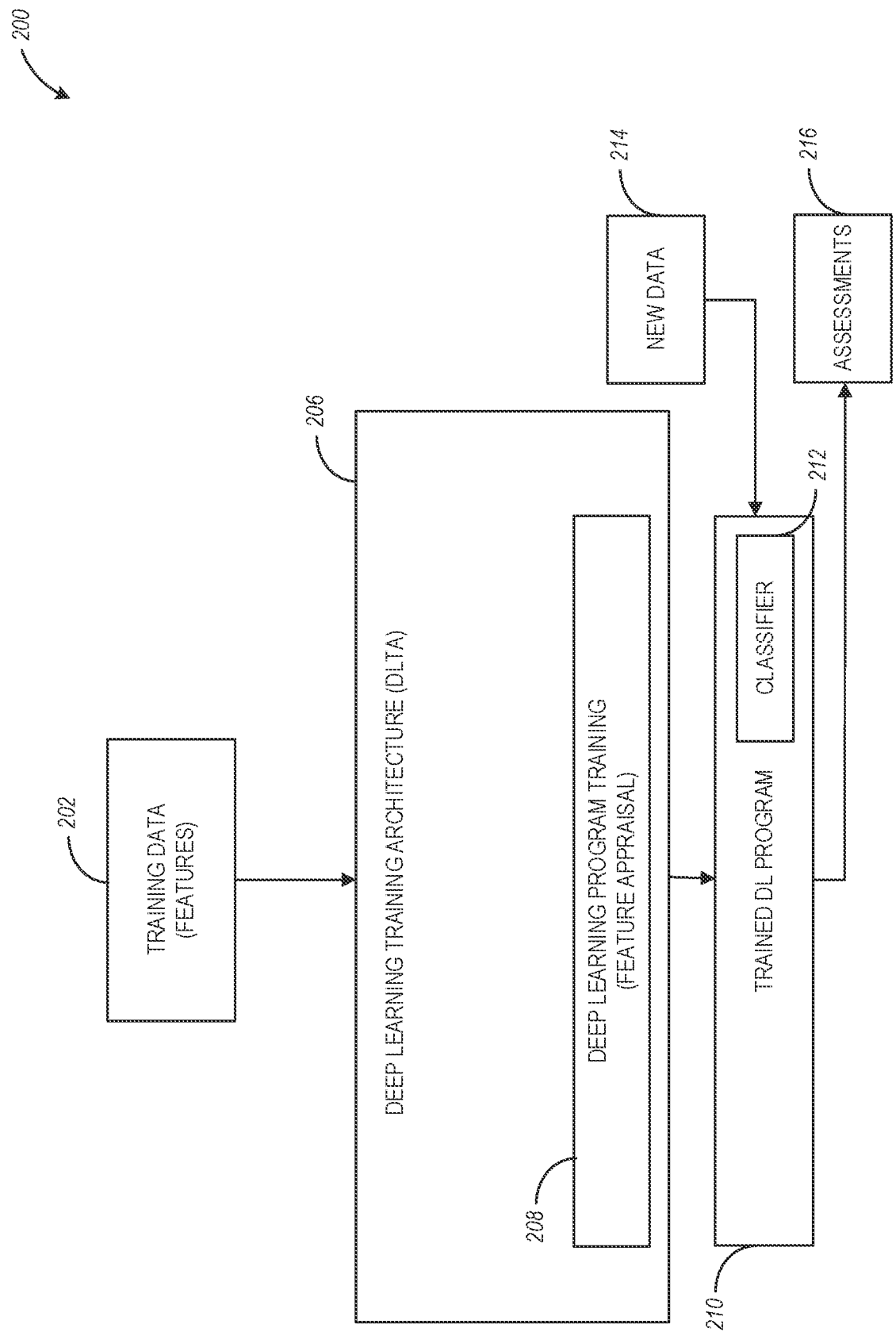
FIG. 2 is a block diagram illustrating the training of a deep learning (DL) program using a DL training architecture, according to some example embodiments.

FIG. 2 is a block diagram 200 illustrating the training of a deep learning (DL) program 210 using a DL training architecture, according to some example embodiments. In some example embodiments, machine-learning programs (MLPs), including deep learning programs or reinforcement learning (RL) programs, also collectively referred to as machine-learning techniques or tools, are utilized to perform operations associated with correlating data or other artificial intelligence (AI)-based functions. In some embodiments, the disclosed machine-learning techniques may be performed by one or more resource management network entities (e.g., the RMN 118) in connection with resource management for wireless access networks. Even though FIG. 2 and FIG. 3 discuss techniques associated with deep learning, RL, or other techniques that may be used as well.

As illustrated in FIG. 2, DL program training 208 can be performed within the deep-learning training architecture (DLTA) 206 based on training data 202. During the DL program training 208, features from the training data 202 can be assessed for purposes of further training of the DL program. The DL program training 208 results in a trained DL program 210 which can include one or more classifiers 212 that can be used to provide assessments 216 based on new data 214.

Deep learning is part of machine learning, which is a field of study that gives computers the ability to learn without being explicitly programmed. Machine learning explores the study and construction of algorithms, also referred to herein as tools, that may learn from existing data, may correlate data, and may make predictions about new data. Such machine learning tools operate by building a model from example training data (e.g., 202) to make data-driven predictions or decisions expressed as outputs or assessments 216. Although example embodiments are presented concerning a few machine-learning tools (e.g., a deep learning training architecture), the principles presented herein may be applied to other machine learning tools.

In some example embodiments, different machine learning tools may be used. For example, Logistic Regression (LR), Naive-Bayes, Random Forest (RF), neural networks (NN), matrix factorization, and Support Vector Machines (SVM) tools may be used during the DL program training 208 (e.g., for correlating the training data 202).

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, the DLTA 206 can be configured to use machine learning algorithms that utilize the training data 202 to find correlations among identified features that affect the outcome.

The machine learning algorithms utilize features from the training data 202 for analyzing the new data 214 to generate the assessments 216. The features include individual measurable properties of a phenomenon being observed and used for training the ML program. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs. In some aspects, training data can be of different types, with the features being numeric for use by a computing device.

In some aspects, the features used during the DL program training 208 can include one or more of the following: sensor data from a plurality of sensors (e.g., audio, motion, image sensors); actuator event data from a plurality of actuators (e.g., wireless switches or other actuators); external information source from a plurality of external sources; timer data associated with the sensor state data (e.g., time sensor data is obtained), the actuator event data, or the external information source data; user communications information; user data; user behavior data, and so forth.

The machine learning algorithms utilize the training data 202 to find correlations among the identified features that affect the outcome of assessments 216. In some example embodiments, the training data 202 includes labeled data or other network data, which is known data for one or more identified features and one or more outcomes within a communication network. With the training data 202 (which can include identified features), the DL program is trained using the DL program training 208 within the DLTA 206. The result of the training is the trained DL program 210. When the DL program 210 is used to perform an assessment, new data 214 is provided as an input to the trained DL program 210, and the DL program 210 generates the assessment 216 as an output.

Figure 3:
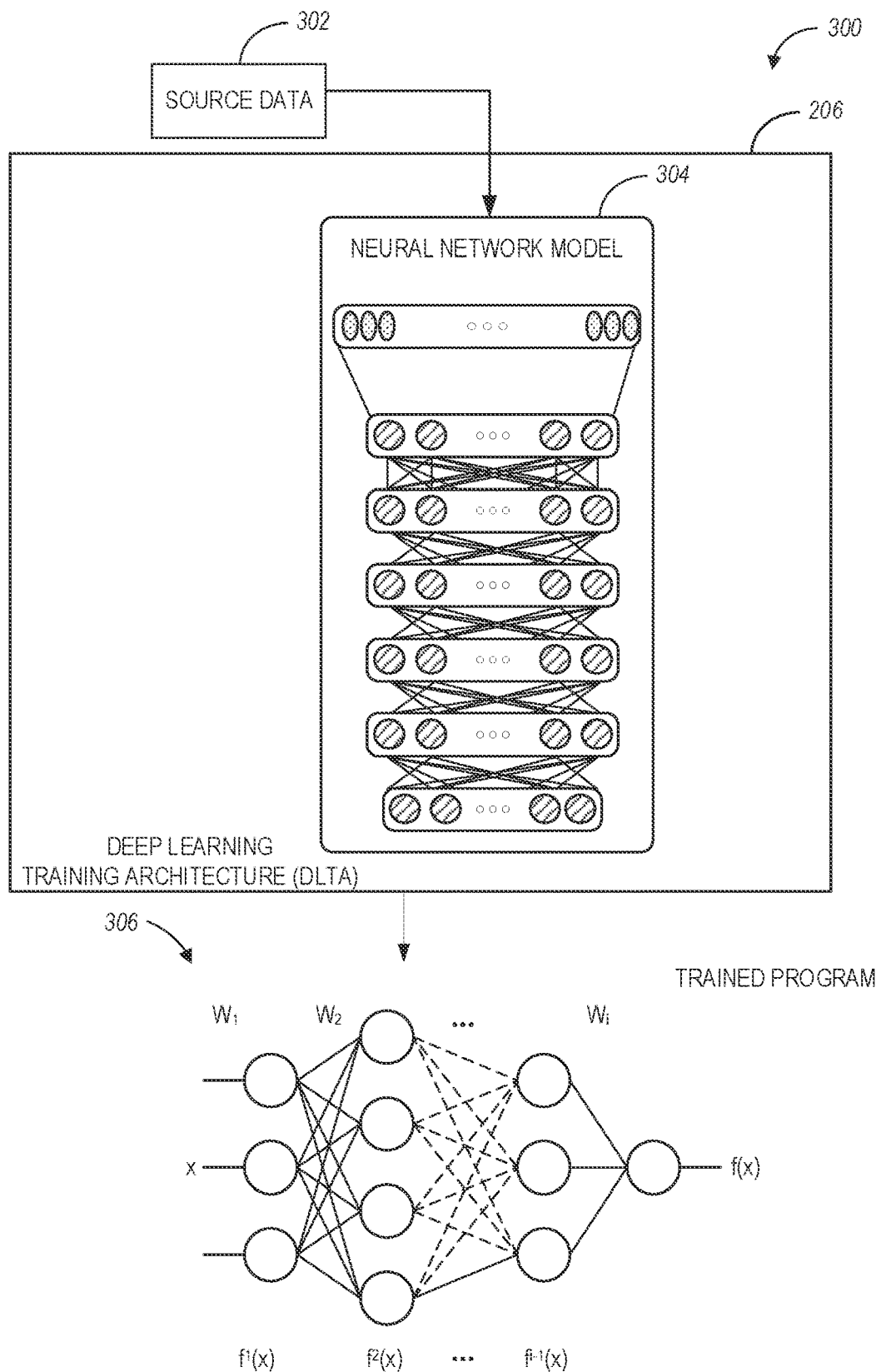
FIG. 3 is a diagram illustrating the generation of a trained DL program using a neural network model trained within a DL training architecture, according to some example embodiments.

FIG. 3 is a diagram 300 illustrating the generation of a trained DL program 306 using a neural network model 304 trained within a DLTA 206, according to some example embodiments. Referring to FIG. 3, source data 302 can be analyzed by a neural network model 304 (or another type of a machine-learning algorithm or technique) to generate the trained DL program 306 (which can be the same as the trained DL program 210 in FIG. 2). The source data 302 can include a training set of data, such as 202, including data identified by one or more features. As used herein, the terms "neural network" and "neural network model" are interchangeable.

Machine-learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs, in which the training dataset is repeatedly fed into the model to refine its results (i.e., the entire dataset is processed during an epoch). During an iteration, the model (e.g., a neural network model or another type of machine learning model) is run against a mini-batch (or a portion) of the entire dataset. In a supervised learning phase, a model is developed to predict the output for a given set of inputs (e.g., source data 302) and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables (e.g., weights, biases, or other parameters) are adjusted to attempt to better refine the model iteratively. As used herein, the term "weights" is used to refer to the parameters used by a machine learning model. During a backward computation, a model can output gradients, which can be used for updating weights associated with a forward computation.

In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to the desired result, but as the training dataset may be varied, and is preferably very large, perfect accuracy and precision may not be achievable. Several epochs that make up a learning phase, therefore, may be set as a given number of trials or a fixed time/computing budget or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine the accuracy of the model in handling data that has not been trained on. In a second example, a false positive rate or false-negative rate may be used to evaluate the models after finalization. In a third example, a delineation between data clusters in each model is used to select a model that produces the clearest bounds for its clusters of data.

In some example embodiments, the DL program 306 is trained by a neural network model 304 (e.g., deep learning, deep convolutional, or recurrent neural network), which comprises a series of "neurons," such as Long Short Term Memory (LSTM) nodes, arranged into a network. A neuron is an architectural element used in data processing and artificial intelligence, particularly machine learning, that includes memory that may determine when to "remember" and when to "forget" values held in that memory based on the weights of inputs provided to the given neuron. Each of the neurons used herein is configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance is related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted throughout a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of the feature is related to that of an explanatory variable used in statistical techniques such as linear regression. Further, deep features represent the output of nodes in hidden layers of the deep neural network.

A neural network (e.g., neural network model 304), sometimes referred to as an artificial neural network or a neural network model, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection between neurons, called a synapse, can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A graph neural network (GNN) is a class of neural networks for processing data represented by graph data structures.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In the training of a DNN architecture, a regression, which is structured as a set of statistical processes for estimating the relationships among variables, can include the minimization of a cost function. The cost function may be implemented as a function to return a number representing how well the neural network performed in mapping training examples to correct output. In training, if the cost function value is not within a predetermined range, based on the known training images, backpropagation is used, where backpropagation is a common method of training artificial neural networks that are used with an optimization method such as stochastic gradient descent (SGD) method.

The use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backward, starting from the output, until each node has an associated error value that roughly represents its contribution to the original output. Backpropagation can use these error values to calculate the gradient of the cost function concerning the weights in the neural network. The calculated gradient is fed to the selected optimization method to update the weights to attempt to minimize the cost function.

Even though the training architecture 206 is referred to as a deep learning training architecture using a neural network model (and the program that is trained is referred to as a trained deep learning program, such as 210 or 306), the disclosure is not limited in this regard and other types of machine learning training architectures may also be used for model training, using the techniques disclosed herein.

Figure 4:
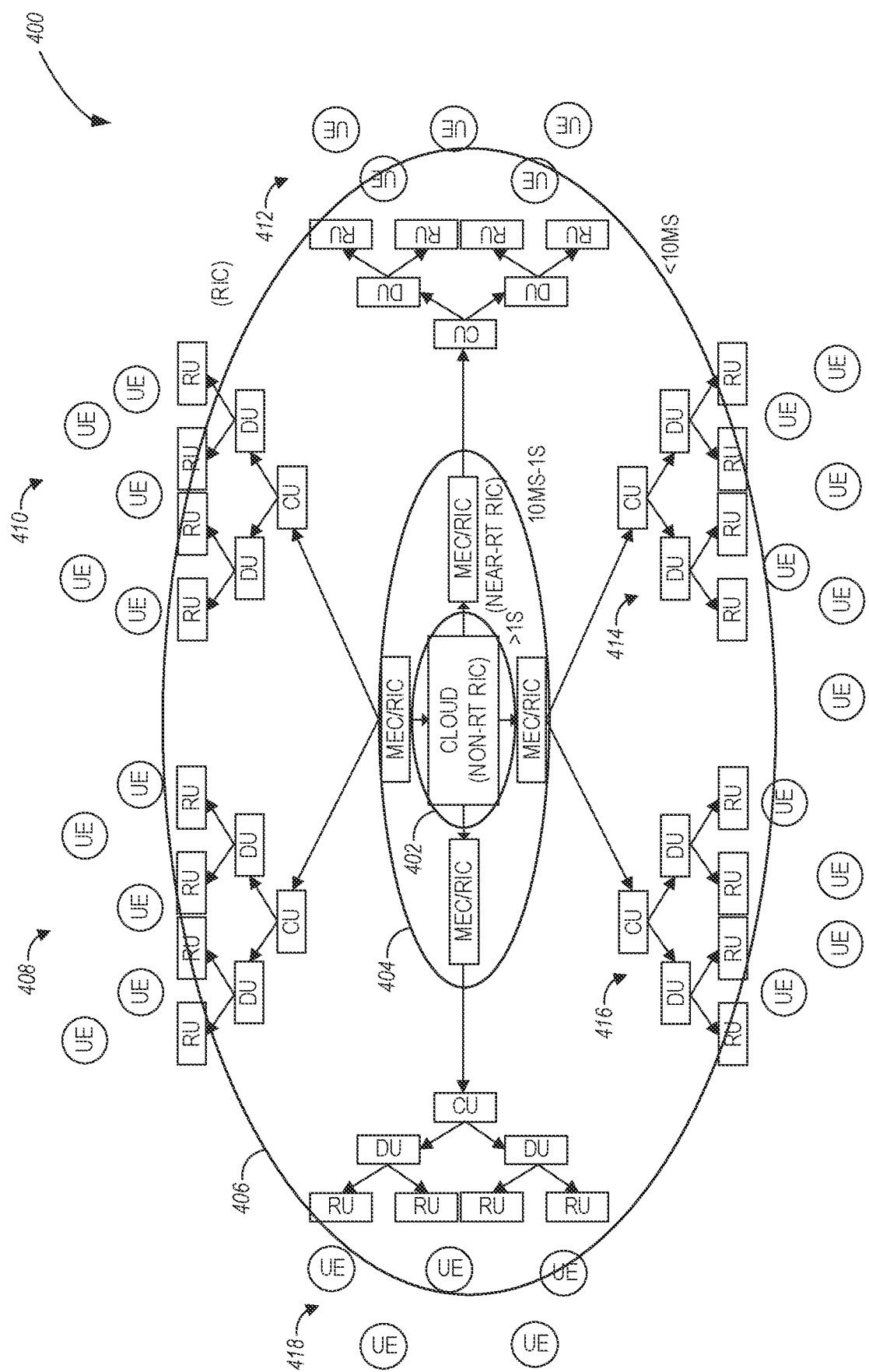
FIG. 4 illustrates graph abstraction of next generation wireless networks, according to some example embodiments.

FIG. 4 illustrates graph abstraction 400 of next generation wireless networks, according to some example embodiments. Referring to FIG. 4, the graph abstraction 400 includes a cloud network layer 402 (which may be associated with a non-RT RIC), a MEC/RIC layer 404 (which may be associated with one or more near-RT RICs), and real-time network layer 406 (which may be associated with one or more RICs). The real-time network layer 406 may include network clusters 408, 410, 412, 414, 416, and 418 formed by a CU function, one or more DU functions, one or more radio units (RUs), and user equipments (UEs).

Neural networks may be used for image and video analytics. Such applications of neural networks utilize regular and Euclidian data structures to extract features from images using convolutional neural network processing. However, the data structure in the wireless network is non-Euclidian and irregular as shown in FIG. 4. Therefore, in some embodiments, wireless networks may be modeled using graph neural networks. For example, the disclosed techniques may be used for modeling a heterogenous wireless radio access network with multiple types of nodes, such as a CU, DUs, and RUs. These functions can interact with interfaces defined between them. Each logical function of the wireless network may be represented as a node and each interface as an edge in a graph. Representing a wireless network as a graph allows for the extraction of relevant features from network logical entities using graph neural network tools such as a graph convolutional neural network or a spatial-temporal neural network. These tools can learn hidden spatial and temporal features of networks with different scales and configurations without significant performance loss. Additionally, a GNN can model entire (e.g., very large scale) heterogenous and/or irregular networks and enable scalable local processing. The disclosed GNN architecture may be used for providing scalable optimization/adaptation solutions, modeling infrastructure where modeling is not accurate or not available, and facilitating joint optimization of multi-layer and multi-time scale access networks.

The disclosed techniques may be used to design and develop a scalable, intelligent, and autonomous infrastructure to enable a resilient and self-organized network (SON) of (small) cells as well as data-driven wireless network management. The disclosed techniques further consider the fundamental architecture of wireless networks and underlying structures and provide several solutions for next generation communication systems.

The disclosed techniques provide details of a hierarchical and spatial optimization framework, as well as details of reinforcement learning and graph neural network architecture in the different embodiments. Additionally, the disclosed techniques further provide an example architecture over carrier aggregation which impacts multiple layers of a network stack as shown in FIG. 5.

Figure 5:
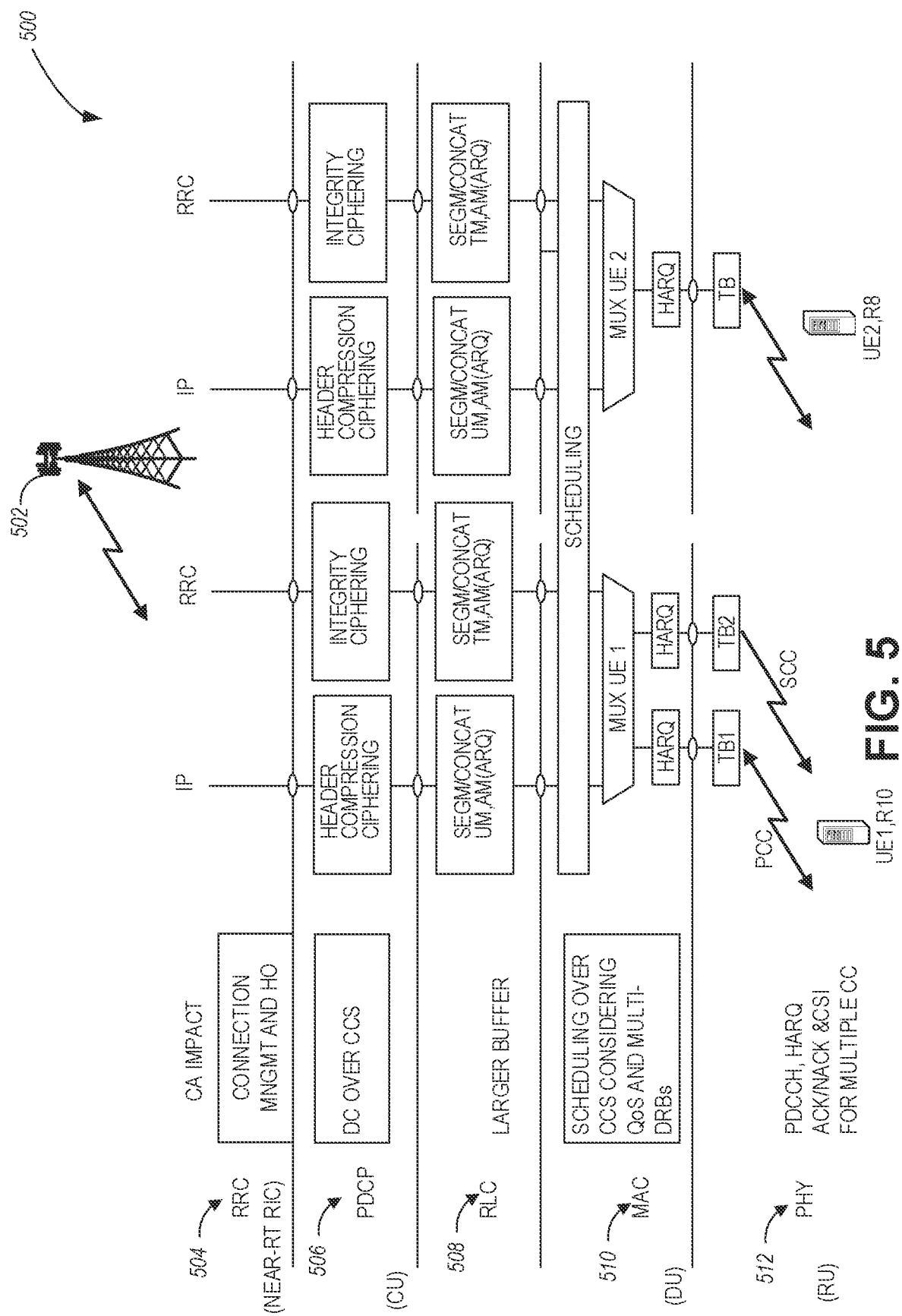
FIG. 5 illustrates an example hierarchy in a wireless access network that may use the disclosed resource management techniques, according to some embodiments.

FIG. 5 illustrates an example network stack hierarchy 500 in a wireless access network with a base station 502, where the network stack hierarchy 500 uses the disclosed resource management techniques, according to some embodiments. Referring to FIG. 5, the network stack hierarchy 500 includes a radio resource control (RRC) layer 504, a packet data convergence protocol layer 506, a radio link control (RLC) layer 508, a media access control (MAC) layer 510, and a physical layer (PHY) 512.

As shown in FIG. 5, a connection management and handover problem may be considered at the highest level of hierarchy (e.g., the RRC layer 504) operating in near-real-time control. This layer observes a wider range of network nodes (e.g., CUs, DUs, and RUs) and obtains insights about the network status. This layer may further provide input to a lower layer which is responsible for the selection of base stations for dual connectivity (DC) or single connectivity depending on a metric (e.g., QoS target) defined for the higher layer agent. In some aspects, after the base station and UE association, the selection of dual connectivity or single connectivity may happen in a faster time scale depending on network load and channel conditions. Additionally, component carrier (CC) selection within the same layer (at the layer of dual connectivity selection) may be considered, depending on the data traffic of the corresponding UE. If there is more data traffic or more reliability for the UE requirement, multiple component carriers can be selected. In some aspects, at the last layer of control (e.g., the MAC layer 510), scheduling of UEs (select subset of active users) may be performed over component carriers and multiple DRBs according to metrics defined (e.g., based on a QoS target), as mentioned above. In summary, the functions defined in the wireless network may be designed and optimized independently of each other and without considering the impact of each other in case of failure. As a result, current wireless systems are leading to non-resilient and suboptimal network management.

Figure 6:
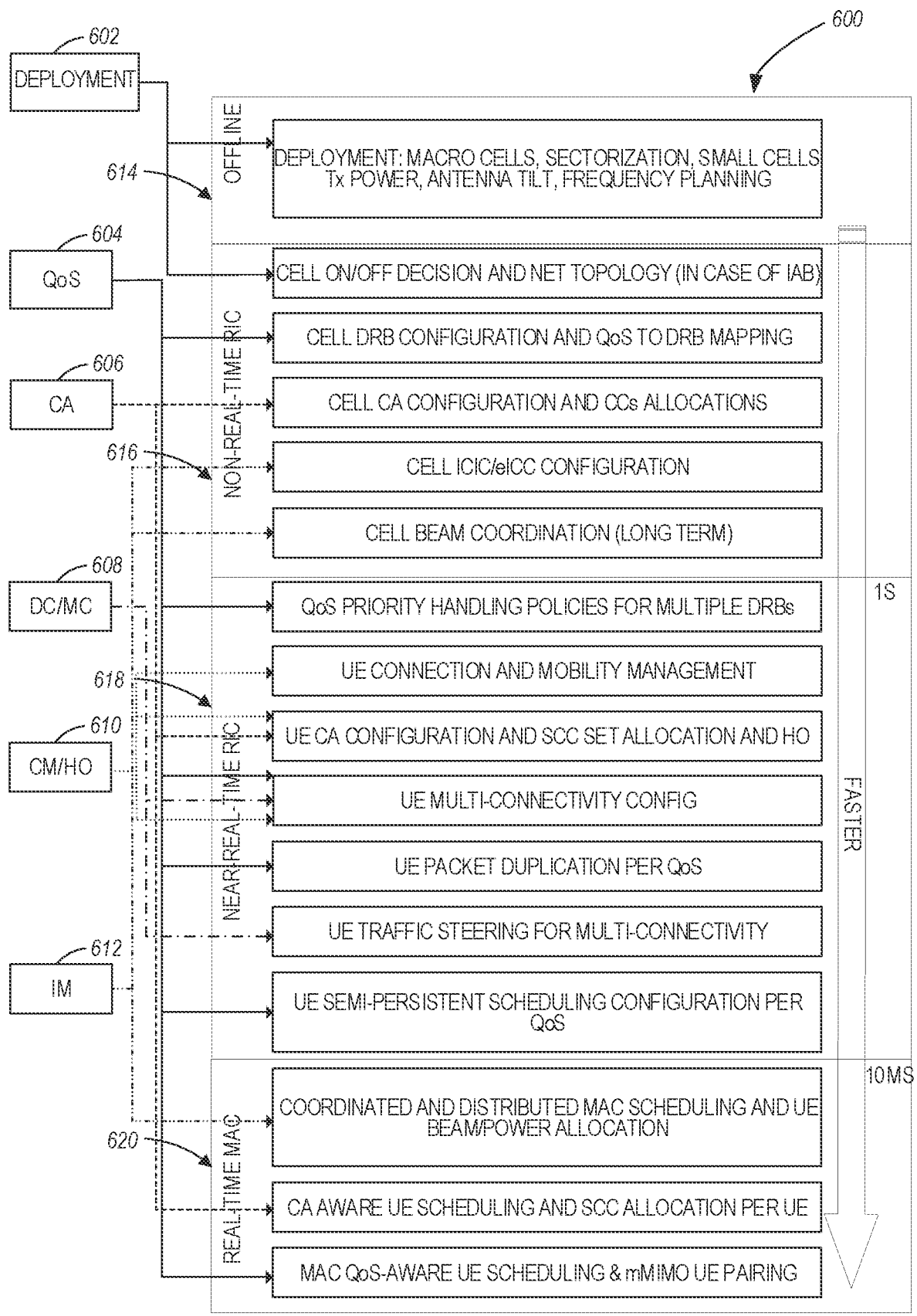
FIG. 6 illustrates a plurality of network functions configured as a plurality of machine learning models forming a multi-level hierarchy, according to some embodiments.

FIG. 6 illustrates a plurality of network functions configured as a plurality of machine learning models forming a multi-level hierarchy 600, according to some embodiments.

In some embodiments, the disclosed techniques are used to design intelligent agents at each layer illustrated in FIG. 6, which are jointly optimized for the same metric (e.g., a QoS target). Each layer may provide input to its lower layer in different time scales. The higher layer intelligent agent(s) operates in a slower time scale as discussed above and provides control input to a lower layer operating in a faster time scale. In some aspects, each function may be divided into a hierarchy of smaller functions to achieve better optimization.

An example architecture for using the functions is provided in FIG. 6, which illustrates a configuration where each network function is assigned to a specific control loop. As an example, FIG. 6 illustrates function utilization in connection with 6 different network tasks: deployment optimization 602, QoS optimization 604, carrier aggregation (CA) 606, dual connectivity and multi-connectivity (DC/MC) 608, connection management and handover (CM/HO) 610, and interference management (IM) 612.

The functions at each of control loop layers 614, 616, 618, and 620 are illustrated in FIG. 6. As shown in the figure, each network task may require functions from a single or multiple control loops, and at each control loop, it may have multiple functions, too. For example, the interference management task has two control loops defined, non-real-time and real-time only. At the non-real-time, cell inter-cell interference coordination (ICIC) and enhanced inter-cell coordination (eICC) configuration and cell beam coordination may be used. In some embodiments, two intelligent agents may be defined, which either have a hierarchy over each other in the same control loop, or they are on the same hierarchy providing control input for lower layers. At the lower layer, in real-time control, coordinated and distributed MAC scheduling and UE beam/power allocation may be used. In summary, the disclosed techniques may be used to design intelligent agents which operate hierarchically over multiple control loops or a single loop with multiple functional blocks. In some embodiments, the disclosed techniques may also include dividing functions into multiple control loops such as QoS management which is divided into 6 functions in every layer of the control loop.

Hierarchical Reinforcement Learning

Figure 7:
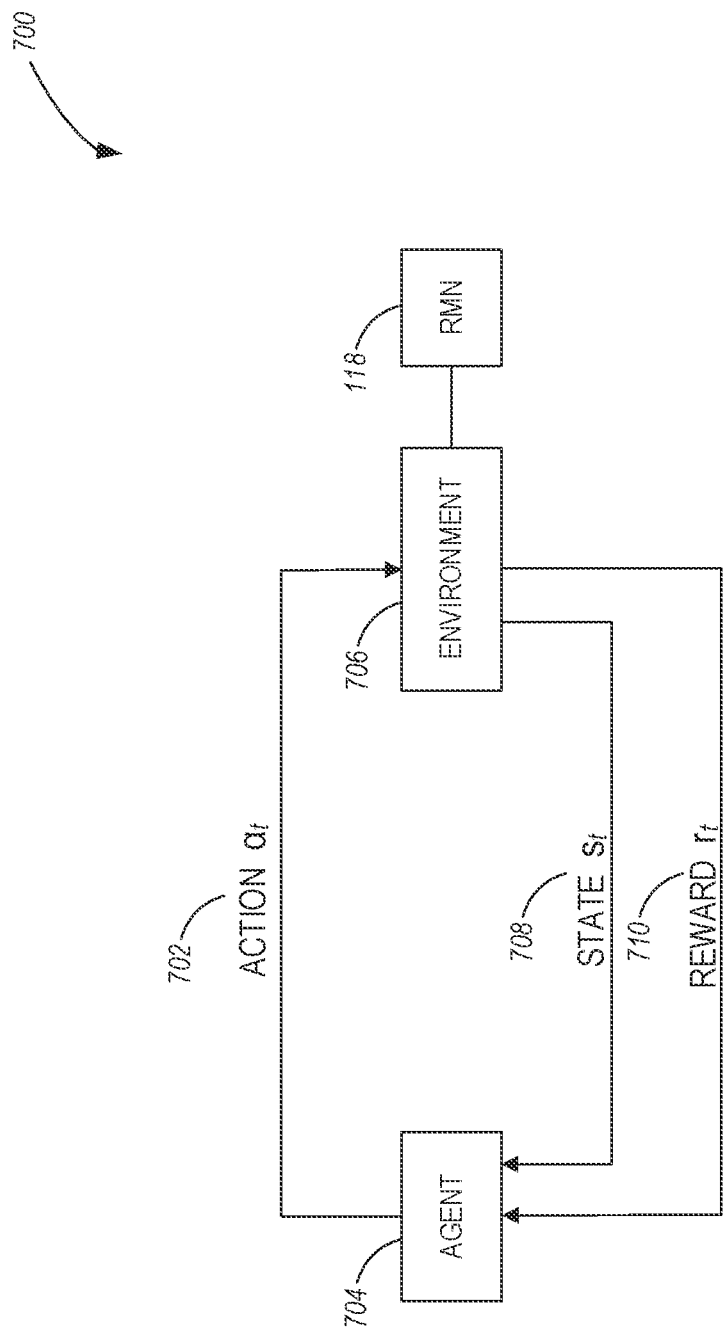
FIG. 7 illustrates an example RL model, according to some embodiments.

FIG. 7 illustrates an example RL model 700, according to some embodiments.

Reinforcement learning (RL) is the training of machine-learning models (or agents) to maximize a cumulative reward. In some aspects, a machine-learning model can be any multi-layer perceptron architecture, recurrent neural network, or convolutional neural network architecture. In some embodiments, RL may be used to learn a policy to achieve a goal or behave in a complex environment. In the RL framework, an agent 704 (e.g., a machine-learning model) takes an action 702, which has some impact on the network environment 706, and the environment returns a reward 710 to guide the algorithm. Reinforcement learning may include the following four main components:

(a) A state 708, which may include a channel measurement or another type of network measurement (e.g., as indicated in Table 1).

(b) An action 702, which may include control actions or signaling needed for a network functionality (e.g., as indicated in Table 1).

(c) A reward 710, which may include a performance measure after taking the action.

(d) Network environment 706, which may include a wireless network with one or more communication channels. In some aspects, the network environment 706 includes the RMN 118, which may be configured to perform one or more of the disclosed functionalities in connection with RL and GNN-based resource management.

An agent can be defined in any form, but the disclosed aspects consider a deep neural network architecture that performs well in areas with relatively small action and/or state spaces such as independent user scheduling and connection management. However, the large-scale network with multiple control loops has large action and state spaces. When action and state spaces are both large, learning a good agent becomes challenging with traditional reinforcement learning models. As a solution, the disclosed techniques may use hierarchical reinforcement learning in which multiple layers of policies are learned in a coordinated manner. Policies running in a slower time scale (located at a higher level in the hierarchy) control policies in a faster time scale (located at a lower level in the hierarchy). The hierarchical reinforcement learning framework disclosed herein may be used to provide simplified control and design of a wireless network, temporal and behavioral abstraction of a network, as well as faster and robust training of neural network architectures.

FIGS. 8-23 illustrate several examples of hierarchical reinforcement learning approaches for resilient wireless network optimization, which can be implemented using the RMN 118.

Hierarchical Temporal Abstraction of Wireless Network Functions

In some aspects, the disclosed techniques may be used to model wireless network functions as reinforcement learning agents, which are composed of multiple-level hierarchical agents. In this model, a network function in a slower time scale provides a control signaling for a network function in a faster time scale such that all the functions within the same hierarchical flow jointly optimize given wireless network performance. Unlike parallel and independent agents, the proposed framework may provide better control, performance, and resiliency against failure events because a higher level agent may have more visibility about network status and it has more control over the final goal (e.g., a performance task).

In some aspects, a reinforcement learning framework may be based on two or more levels of hierarchical learning agents. As an example, a two-level temporal abstraction is provided in FIG. 8.

Figure 8:
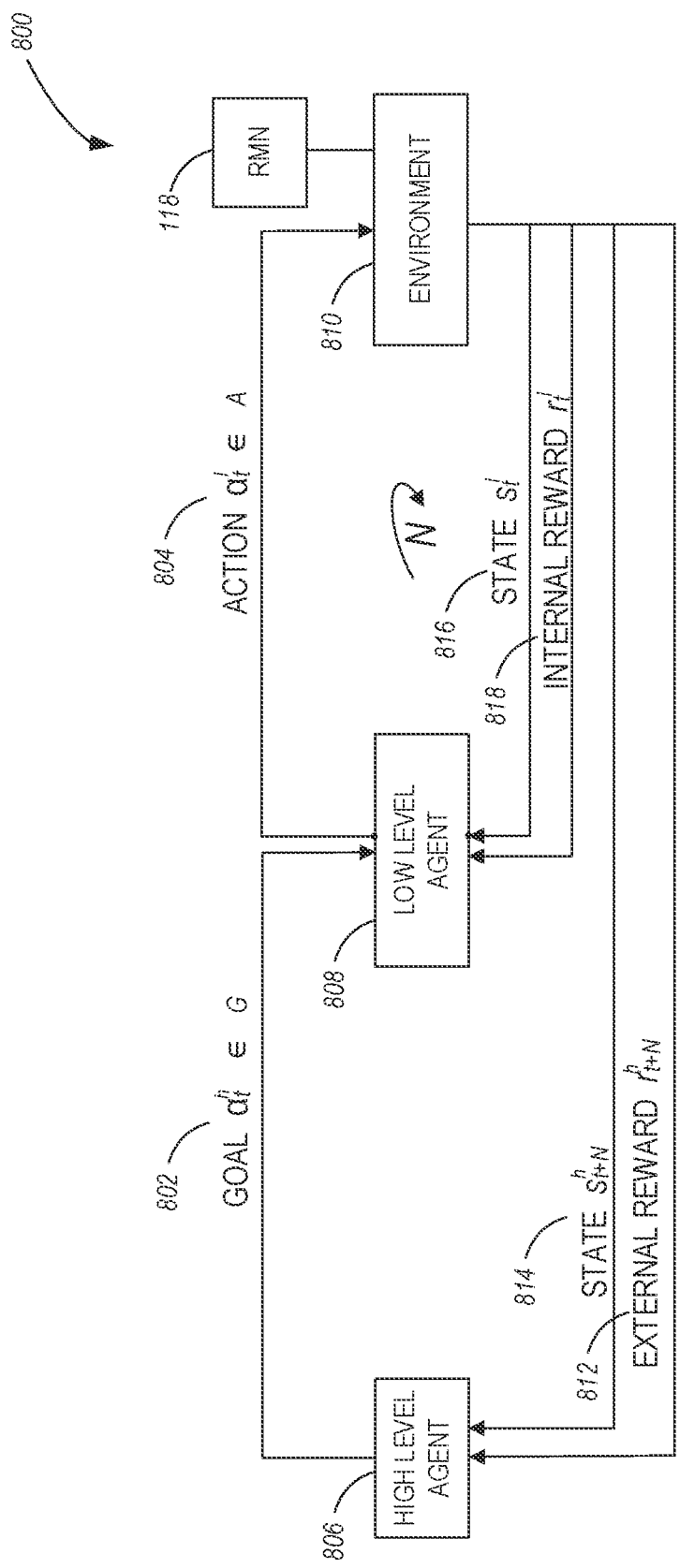
FIG. 8 illustrates a multi-level (e.g., a two-level) hierarchical temporal abstraction, according to some embodiments.

FIG. 8 illustrates a multi-level (e.g., a two-level) hierarchical temporal abstraction 800, according to some embodiments. More specifically, a higher level agent 806 acts upon a lower level agent 808. In some embodiments, an agent can be defined as either a policy function $\pi(a_t^h|s_t^h)$ or a value function $Q(s_t^h, a_t^h)$, where $s_t^h$ is the input state and $a_t^h$ is the action for the higher-level agent 806 at time index t. The lower level agent can be defined similarly.

In the framework of FIG. 8, the higher-level agent 806 gets its state input (e.g., of state 814) from the environment 810 (e.g., from the RMN 118) at every N time step t, selects an action (goal) 802 for the lower level agent 808. The lower-level agent looks at its state input (e.g., state 816) from the environment 810 as well as the goal 802 defined by its higher-level agent 806, and then selects an action 804 to act upon the environment 810 for N time steps. In return, these agents receive rewards 818 and 812 from the environment 810 to update their policy and value functions during training. In summary, the higher-level agent learns how to manage and control the lower-level agent, and picks a target for the lower-level agent based on its state (channel and network observation/measurements). The lower-level agent 808 is responsible for taking atomic actions and receives a reward 818 if the goal defined by the higher-level agent 806 is achieved. In some aspects, the above formulation can be extended to multiple levels of temporal abstraction by adding more agent levels. During reinforcement learning inference, each agent decides their action based on their network observation/measurement with optimized parameters of the neural network.

In some embodiments, a higher level agent may be configured as any non-real-time functions or near-real-time functions defined in Table 1, and the lower level agent as near-real-time functions or real-time functions defined in Table 1, respectively. In this regard, a single optimization metric is defined for the problem. In other words, the design goal of all the agents is to optimize a single network metric.

For example, a lower-level agent can be a MAC scheduler operating in every transmission time interval (TTI) to schedule multiple users at the same base station. The higher-level agent is responsible for the handover management of users between base stations. In addition, a single function (such as a MAC scheduler) may be considered and split into multiple layers of hierarchy for better management. The reward function can be defined as any performance measure for the specific task of interest such as the quality of service of a user. A more general hierarchical reinforcement learning model for wireless networks is given in FIG. 9.

Figure 9:
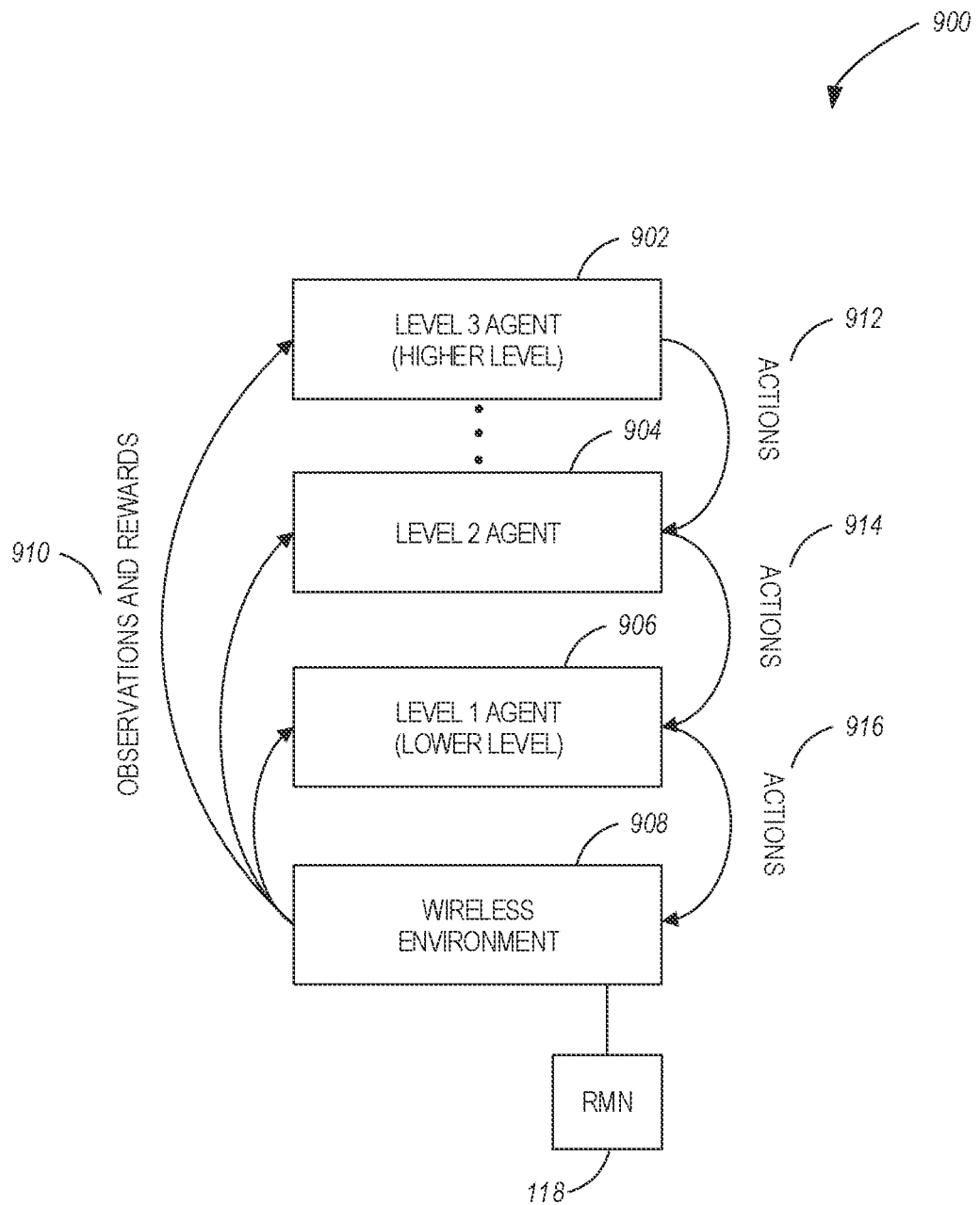
FIG. 9 illustrates hierarchical reinforcement learning with temporal abstraction for wireless networks optimizing a single optimization metric, according to some embodiments.

FIG. 9 illustrates hierarchical reinforcement learning 900 with temporal abstraction for wireless networks optimizing a single optimization metric, according to some embodiments. In some embodiments, the hierarchy can be defined over a multiple control loop, or a single control loop can be divided into multiple hierarchies. Referring to FIG. 9, the hierarchical reinforcement learning 900 can be configured by the RMN 118 of wireless environment 908 and can include agents 902, 904, and 906 at different levels in the hierarchy. Observations and rewards (collectively, 910) are communicated by the wireless environment 908 to the agents, and actions 912, 914, and 916 are communicated from higher-level agents to lower-level agents (as well as the environment).

In FIG. 9, the role of each agent can be any network function given in Table 1. Since the level 3 agent 902 is located at a more central part of the network, it is connected to many base stations and users. Therefore, the level 3 agent 902 has more visibility about the environment and can provide better guidance to the level 2 agent 904, which is connected to a smaller number of base stations and users. As a result, the hierarchical reinforcement learning base network operation (e.g., as configured by the RMN 118) will be more resilient.

Hierarchy Over Primitive Policies of a Wireless Network

Reinforcement learning models for wireless networks may consider one primitive policy at a time for a network operation. For example, standard models consider reinforcement learning for interference management by looking at only a part of the network in some conditions. However, wireless networks may have more complex structures which can be difficult to characterize with a single policy. For example, a network may have different quality of service requirements such as ultra-low latency, high throughput, massive connectivity, etc. Additionally, part of the network may have various unforeseen cases such as base station failure, outage, etc. In some embodiments, the disclosed techniques may be used for learning multiple primitive policies for various cases and designing a new agent policy by composing these policies to address more complex situations.

Figure 10:
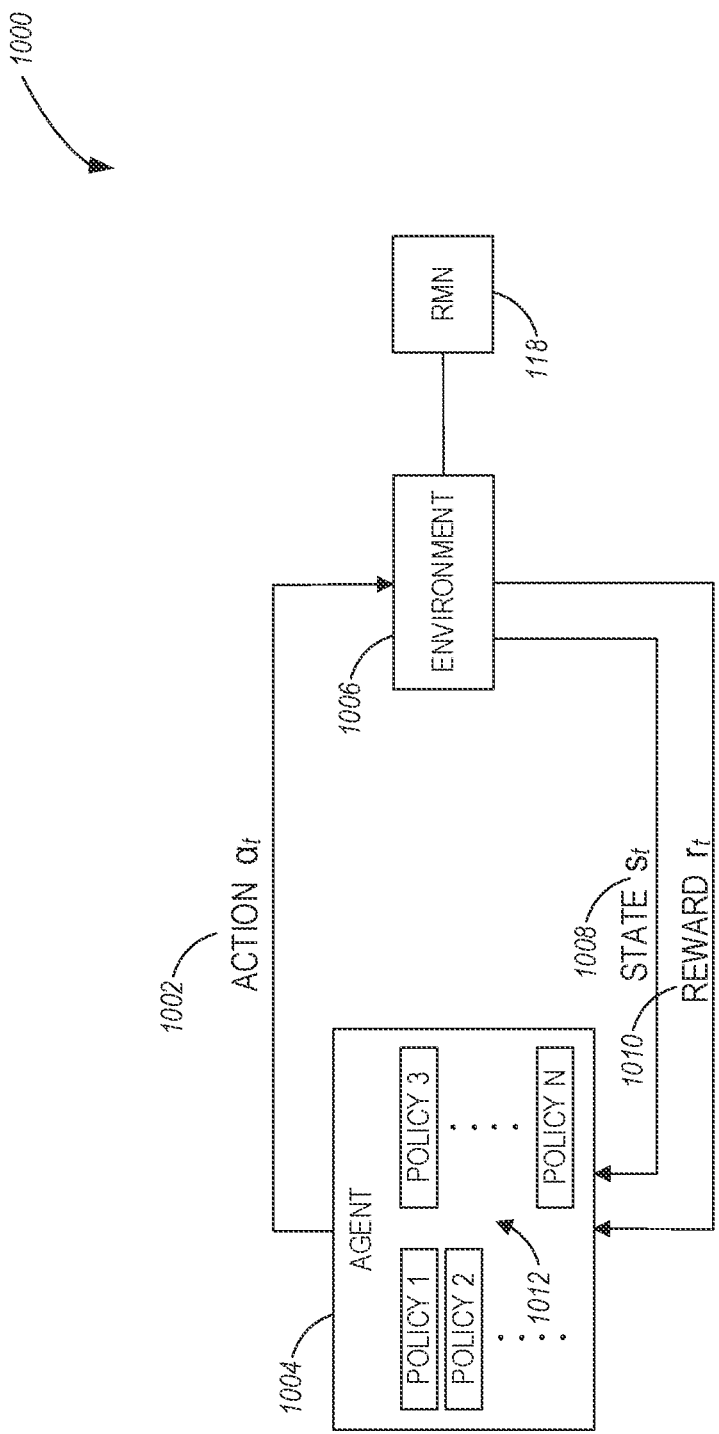
FIG. 10 illustrates an example hierarchy over policies, according to some embodiments.

In some embodiments, an RL framework may be based on using two or more primitive policies per reinforcement learning agent to complete a specific task, as shown in FIG. 10.

FIG. 10 illustrates an example hierarchy 1000 over policies, according to some embodiments. Referring to FIG. 10, agent 1004 including multiple policies 1012 generates an action 1002 for environment 1006. The action 1002 may be generated based on state 1008 communicated by, e.g., RMN 118 in environment 1006. RMN 118 further communicates a reward 1010 based on the action 1002.

In some embodiments, a policy (e.g., of the policies 1012) $\pi_i(a_t|s_t)$, i=1, ..., M is defined as the probability of an action $a_t$ selection for a given state $s_t$ for policy i at time t. The state is considered as any network status reports/measurements that the reinforcement learning agent receives from the channel or network.

In some embodiments, the reinforcement learning agent 1004 knows optimal (or close to optimal) M primitive policies which are designed to achieve different tasks (e.g. quality of service, throughput maximization at outage scenarios) in the network. However, in some scenarios or use cases, more complex service requirements in the network may be used or more resiliency against failure events may be needed. In these scenarios, combining the primitive policies brings to the network more complex behavioral policies. The new combined policies can be obtained as illustrated by the following example equations.

$$\pi(a_t|s_t) = \Sigma_{i=1}^{M} w_i(s_t) \pi_i(a_t|s_t) \text{ or } \pi(a_t|s_t) = \Pi_{i=1}^{N} \pi_i(a_t|s_t)^{w_i(s_t)},$$

where $\Sigma_{i=1}^{M} w_i(s_t) = 1$. With these combined policies, the reinforcement learning agent 1004 may learn weights $w_i(s_t)$ for the new scenario or task, based on the disclosed techniques.

For wireless networks, compositional tasks may be used for each layer of a control loop. Each primitive policy may be optimized for a specific network function and event. In some embodiments, multiple policies per network function may be used, as shown in FIG. 11.

Figure 11:
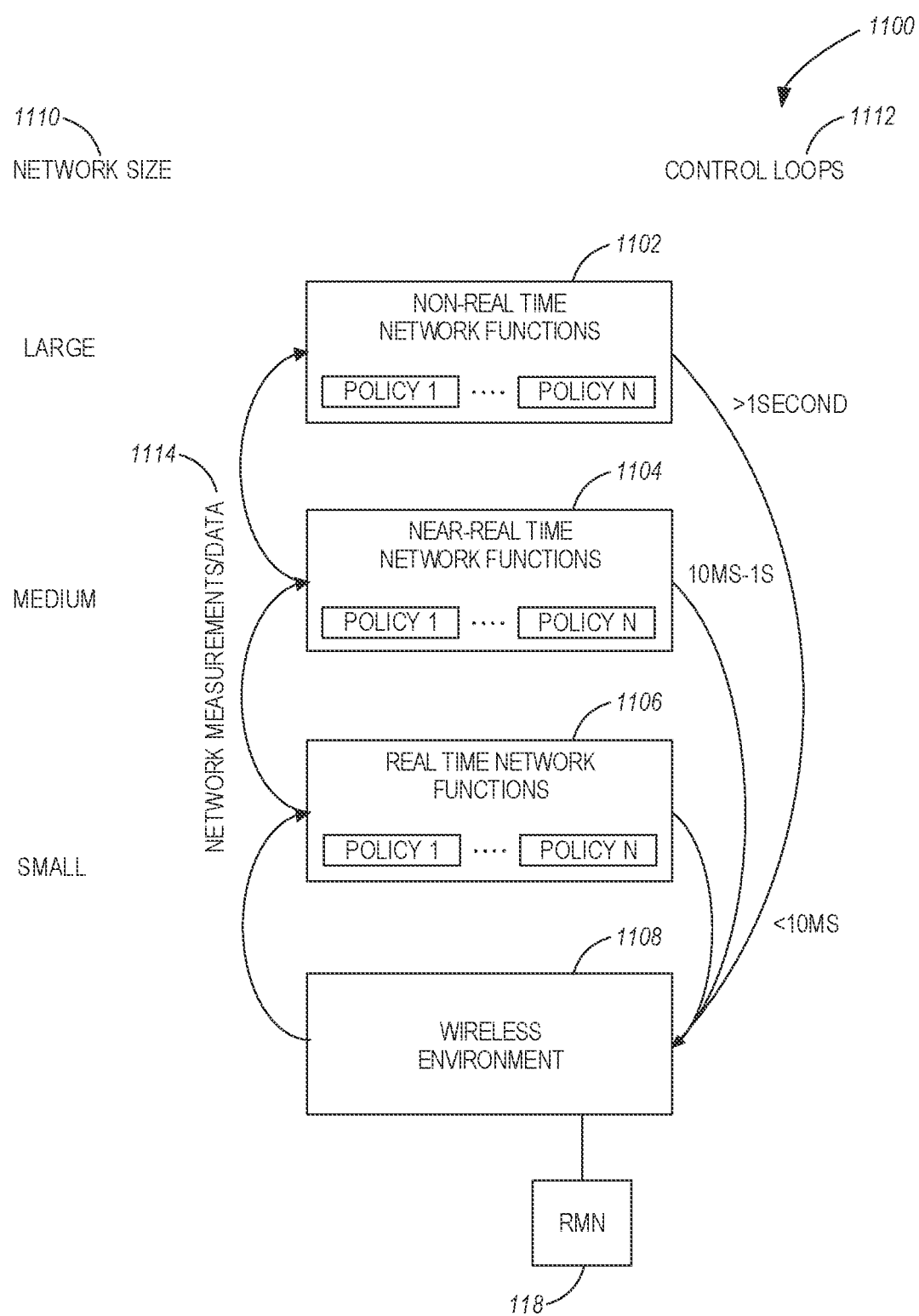
FIG. 11 illustrates an example hierarchy over primitive policies for wireless networks, according to some embodiments.

FIG. 11 illustrates an example hierarchy over primitive policies for wireless networks, according to some embodiments. Referring to FIG. 11, the hierarchy 1100 can be configured by the RMN 118 of wireless environment 1108 and can include network functions (or agents) 1102, 1104, and 1106 (each including one or more policies) associated with different latencies of corresponding control loops 1112. In some aspects, network functions 1102, 1104, and 1106 may be associated with networks of different network size 1110. The wireless environment 1108 may communicate network measurements/data 1114 to the network functions, and corresponding actions are communicated from the network functions to the wireless environment 1108 (e.g., to the RMN 118) based on corresponding latencies associated with the control loops 1112.

In some embodiments, each level of control may have multiple sets of policies for different network functionality. For a given network event, the wireless network combines existing policies with learned weights $w_i(s_t)$ to provide an action to a slower control loop or channel. In some embodiments, the wireless networks may be more robust and resilient to more complex environments by combining multiple policies of one or more network functions. Depending on new applications or channel conditions, reinforcement learning agents can learn new weights online to get better quality of service policy. Since the dimension of weights is much smaller than primitive neural network policies, adaptation can be quicker for new network conditions. For example, for a connection management and handover event given in FIG. 6, a compositional policy may be defined for the learned policies for UE connection and mobility management, UE carrier aggregation (CA) configuration and secondary component carrier (SCC) set allocation and handover (HO), and UE multi-connectivity configuration functions.

Hierarchical Temporal Abstraction of Wireless Network with Adaptive Termination Condition In wireless networks, the granularity and periodicity of each network operation may be fixed and predefined. However, depending on the environment and network use case, adapting time scales of network operations may bring resiliency to the network by acting on time and before failure events. In some aspects, the disclosed techniques may be used to extend the hierarchical temporal abstraction model to learnable termination conditions for control actions. For example, the disclosed techniques may use deep neural networks to model termination conditions and use hierarchical reinforcement learning models to train neural networks.

Figure 12:
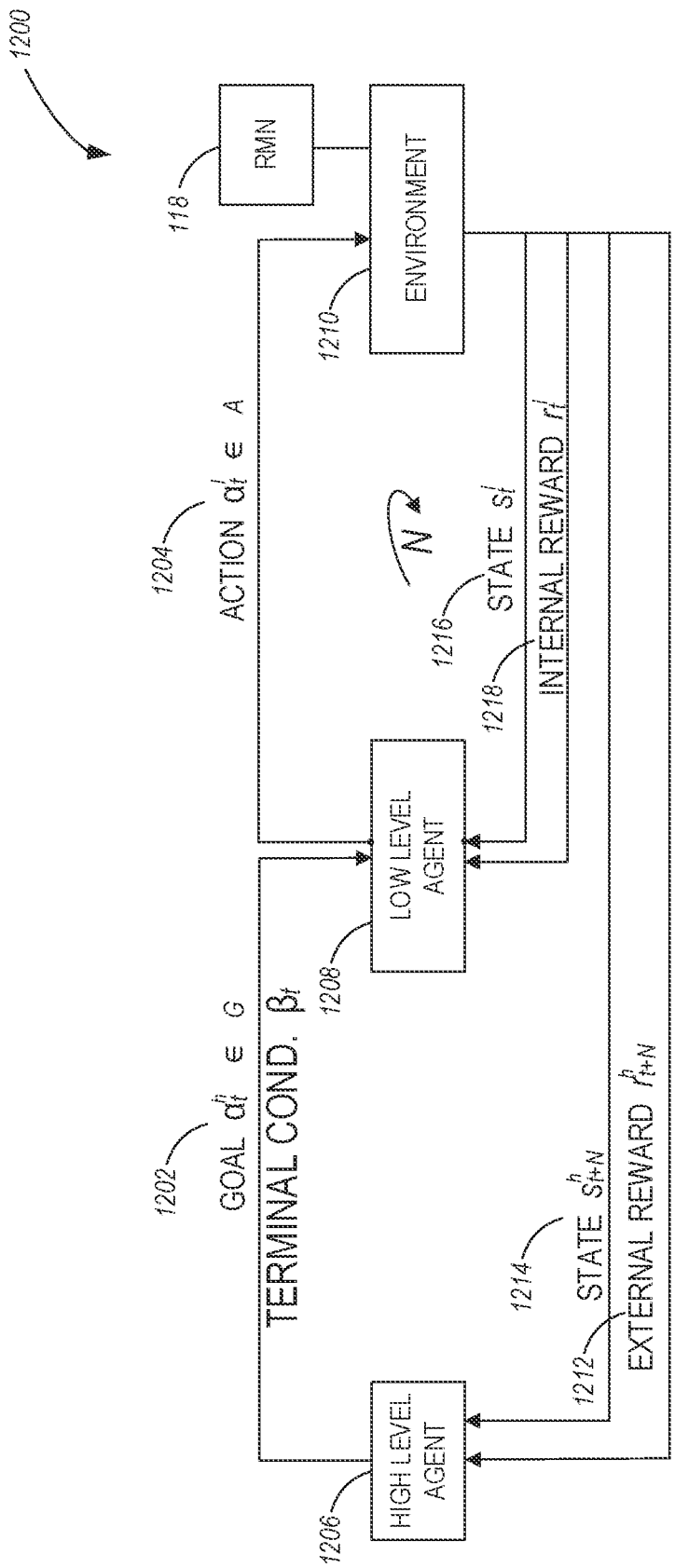
FIG. 12 illustrates a hierarchical temporal abstraction of a wireless network with adaptive termination conditions, according to some embodiments.

FIG. 12 illustrates a hierarchical temporal abstraction 1200 of a wireless network with adaptive termination condition, according to some embodiments. Referring to FIG. 12, the higher-level agent 1206 generates a goal (e.g., action) 1202 for the lower-level agent 1208 based on state 1214 received from environment 1210 (e.g., from RMN 118). The lower level agent 1208 generates action 1204 for environment 1210 based on state 1216 and goal 1202. In response, environment 1210 (e.g., the RMN 118) generates rewards 1212 and 1218 for the higher-level agent 1206 and the lower-level agent 1208 respectively.

As illustrated in FIG. 12, a learnable terminal condition $\beta_t(s_t, a_t)$ may be defined on the actions that high-level agent 1206 takes at time t. In some aspects, $\beta_t(s_t, a_t) \in [0,1]$ can be defined as the probability of terminating action $a_t^h$. The goal of a hierarchical reinforcement agent may be to learn both control action $a_t^h$ and termination condition $\beta_t$ for a given state such that a lower level agent takes better actions $a_t^l$ to get a higher reward from the environment. In some aspects, the lower level agent 1208 may run for predefined N loops. In each of the N loops, the higher-level agent 1206 decides whether to continue to the action $a_t^h$ or not according to a score given by $\beta_t(s_t, a_t)$.

Similar to previous hierarchical temporal models, in some embodiments, this reinforcement learning model may be used for non-real-time, near-real-time, and real-time network functions. Each network function may belong to a corresponding hierarchy in a reinforcement learning model depending on the control order as shown in FIG. 13.

Figure 13:
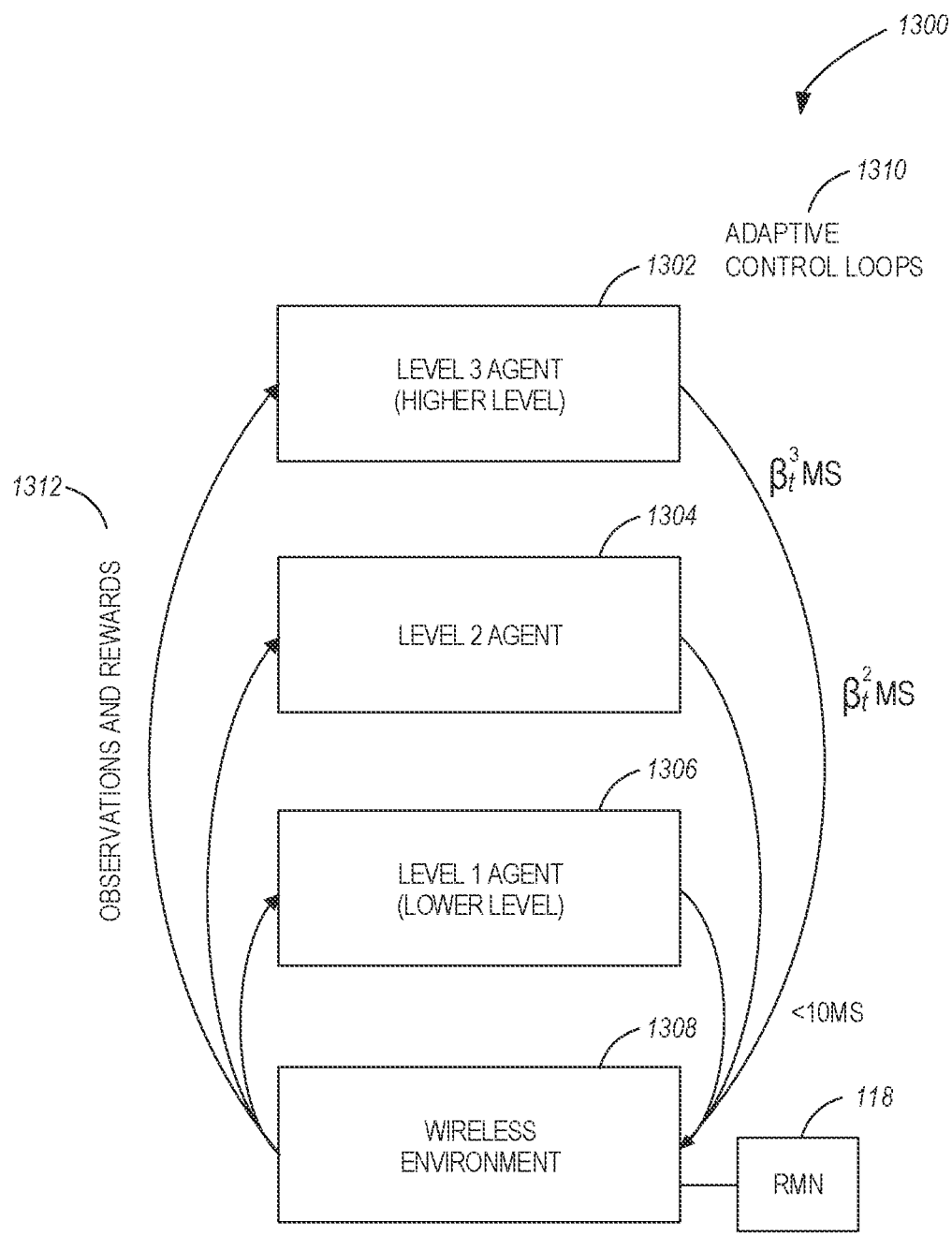
FIG. 13 illustrates a mapping of network functions to a hierarchical temporal abstraction of a wireless network with a terminal condition, according to some embodiments.

FIG. 13 illustrates a mapping of network functions to hierarchical temporal abstraction 1300 of a wireless network with a terminal condition, according to some embodiments. Referring to FIG. 13, hierarchical reinforcement learning can be configured by the RMN 118 of wireless environment 1308, where the hierarchical temporal abstraction 1300 can include agents 1302, 1304, and 1306 at different levels in the hierarchy. Observations and rewards (collectively, 1312) are communicated by the wireless environment 1308 to the agents, and actions associated with different control loops 1310 are communicated from higher-level agents to lower-level agents (as well as the environment).

Unlike previous models, in the embodiment of FIG. 13, fixed control loop periodicity may not be defined. More specifically, each agent may decide their control loop adaptively depending on its observation from the network or the channel. In this regard, the intelligent adaptive control loop brings resiliency to the wireless network by acting fast against failure, reacting fast to changing dynamics, etc. In some embodiments, variable size adaptive control loops may be used as well.

Hierarchical Model Discovery of Wireless Network with Optimal Policy Guidance

In some wireless network operations, an optimal behavior policy may be obtained from some optimization problem or there may be direct expert knowledge available about how to operate these functions. However, obtaining such expert data can be costly, challenging, and it may not be general enough to apply the data to new and unforeseen scenarios. Therefore, the disclosed techniques may include hierarchical policy learning from demonstrated actions for the wireless network. More specifically, this model may be used to clone optimal behavior from demonstrated scenarios and train a neural network to generalize to unexpected situations.

Figure 14:
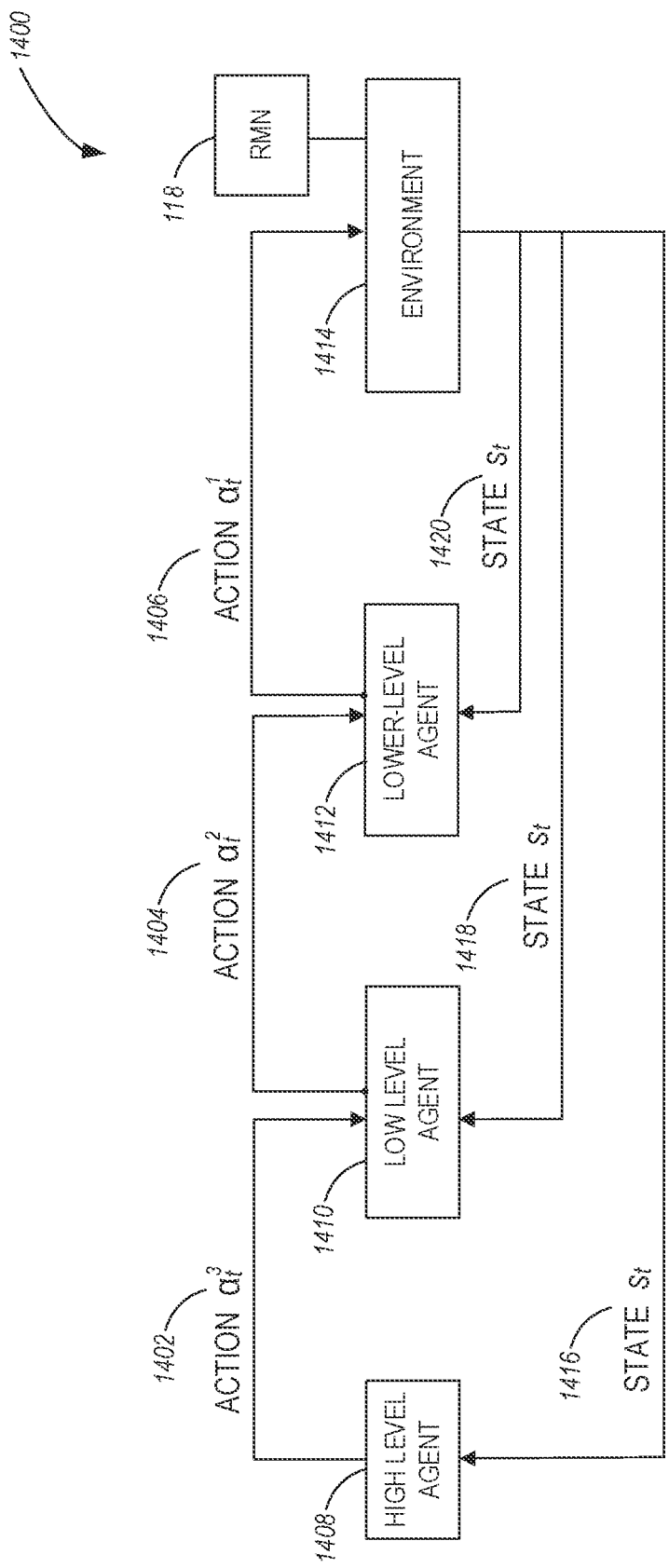
FIG. 14 illustrates a hierarchical model discovery with optimal policy guidance, according to some embodiments.

In some embodiments, a reinforcement learning framework may be based on a model illustrated in FIG. 14.

FIG. 14 illustrates a hierarchical model discovery 1400 with optimal policy guidance, according to some embodiments. Referring to FIG. 14, the high-level agent 1408 generates action 1402 for the low-level agent 1410 based on state 1416 received from environment 1414 (e.g., from RMN 118). The low-level agent 1410 generates action 1404 for the lower level agent 1412 based on state 1418 received from environment 1414 and action 1402. The lower level agent 1412 generates action 1406 for environment 1414 based on state 1420 and action 1404.

In the model of FIG. 14, multiple hierarchical reinforcement agents may be used, as described herein. In FIG. 14, three agents are used, namely, a high-level agent 1408, a low-level agent 1410, and a lower level agent 1412. The high-level agent 1408 makes decisions for the low-level agent 1410, the low-level agent 1410 makes decisions for the lower level agent 1412, and the lower level agent 1412 acts directly on the wireless network (e.g., environment 1414). Unlike previous hierarchical reinforcement learning modeling, in this case, an optimal state-action pair $(s_t, a_t^1)$ for a lower-level agent may be available (e.g., an optimal $(s_t, a_t^1, s_{t+1}, a_{t+1}^1, s_{t+2}, a_{t+2}^1 \ldots)$ is known). In some embodiments, the goal of the reinforcement learning agent is to learn control policies for higher-level agents such that the log-likelihood of given state-action pairs are maximized. By doing so, a behavior model may be learned for the higher-level agent. The learned model can be useful to better guide the lower-level agents in new and unexpected situations using the generalization benefit of a neural network.

Figure 15:
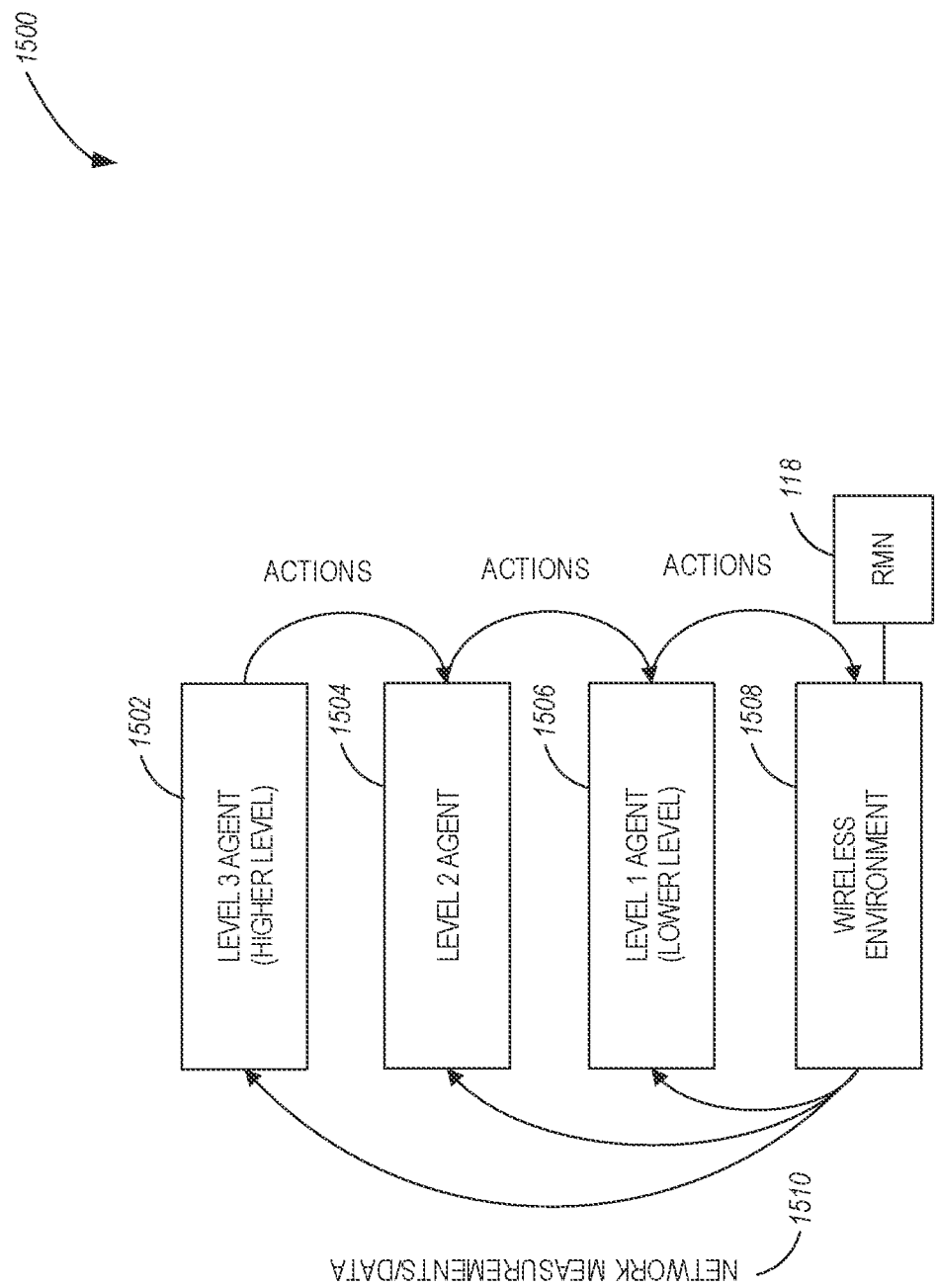
FIG. 15 and FIG. 16 illustrate hierarchical model discovery for wireless networks, according to some embodiments.
Figure 16:
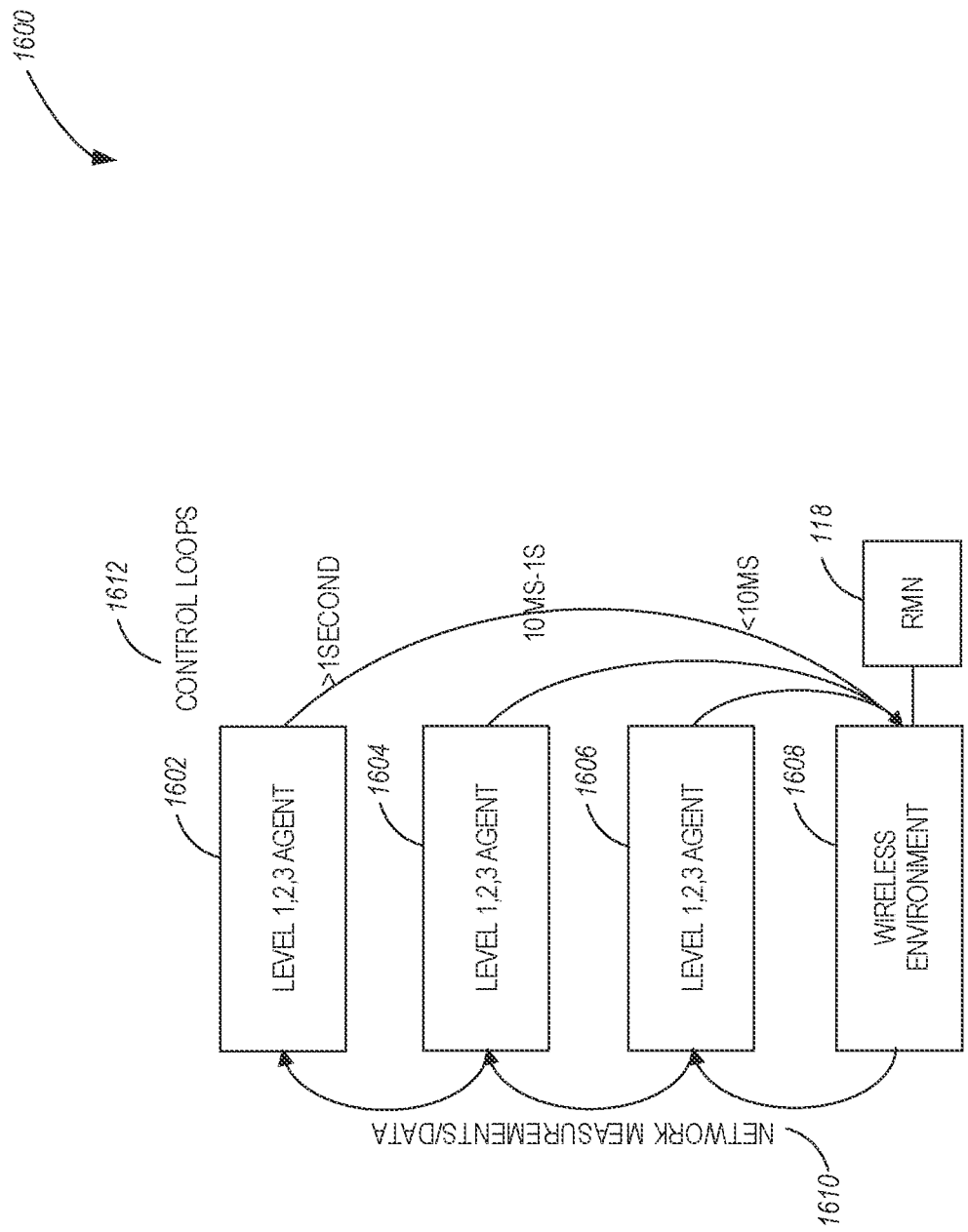

In some embodiments, two models of hierarchical reinforcement learning agents may be configured, as illustrated in FIGS. 15-16.

FIG. 15 and FIG. 16 illustrate hierarchical model discovery for wireless networks, according to some embodiments. Referring to FIG. 15, the hierarchical model 1500 can be configured by the RMN 118 of wireless environment 1508 and can include agents 1502, 1504, and 1506 at different levels in the hierarchy. Network measurements and data 1510 are communicated by the wireless environment 1508 to the agents, and actions are communicated from higher-level agents to lower-level agents (as well as the environment).

Referring to FIG. 16, the hierarchical model 1600 can be configured by the RMN 118 of wireless environment 1608 and can include agents 1602, 1604, and 1606 at different levels in the hierarchy. Network measurements and data 1610 are communicated by the wireless environment 1608 to the agents, and actions associated with one of the control loops 1612 are communicated from each of the agents to the environment 1608.

In the first model illustrated in FIG. 15, the multi-layer hierarchical agent is distributed over control loops as previously defined. In other words, each higher-level agent provides control action to its lower-level agent which operates at a faster time scale.

In the second model illustrated in FIG. 16, each level of an agent is implemented in the same control loop. In this case, each agent provides control action to its lower level in the same time scale. For example, the carrier aggregation task in FIG. 6 can be considered for this embodiment. In the carrier aggregation task, cell CA configuration CCs allocation function, UE CA configuration and SCC set allocation and HO function, and CA aware UE scheduling and SCC allocation per UE functions may be used. A model discovery problem may be designed by collecting optimal carrier aggregation data in a deployment scenario. By using function approximation of future neural networks, the learned model may be used to improve network management in new scenarios.

Hierarchical Temporal Abstraction of a Wireless Network with Intelligent Critic Network In some aspects, wireless network functions may be modeled as a reinforcement learning agent which is a composition of multiple level hierarchical agents as discusses hereinabove. In this model, a network function on a slower time scale provides a control signaling for a network function in a faster time scale such that all the functions within the same hierarchical flow jointly optimize given wireless network performance. However, a wireless environment may be dynamic which may have large value swings in channel and network measurements. Such swings bring unstable and suboptimal behavior in the hierarchical reinforcement learning framework. For example, a wrong decision by a high-level agent may mislead a lower-level agent, and its policy on the environment results in catastrophic failure.

Figure 17:
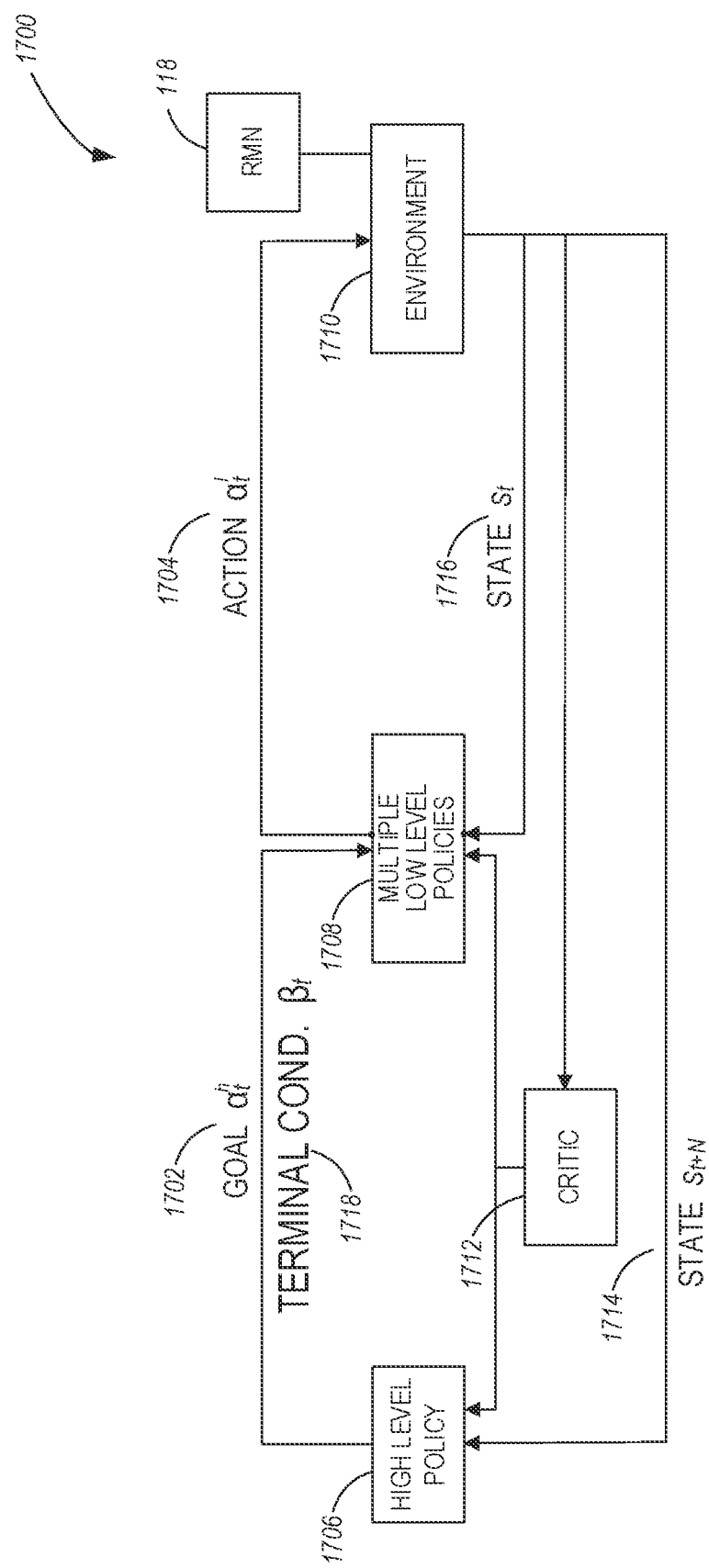
FIG. 17 illustrates hierarchical temporal abstraction with a critic network, according to some embodiments.

In some embodiments, to make the network more robust, a critical neural network may be used to regularize reinforcement learning as shown in FIG. 17.

FIG. 17 illustrates hierarchical temporal abstraction 1700 with a critical neural network, according to some embodiments. Referring to FIG. 17, the high-level agent (e.g., a policy) 1706 generates goal 1702 for the low-level agent (e.g., multiple low-level policies) 1708 based on state 1714 received from environment 1710 (e.g., from RMN 118) as well as input from the critic neural network 1712. The low-level agent 1708 generates action 1704 for the environment 1710 based on state 1716, the goal 1702, and the input from the critic neural network 1712.

In some embodiments, a learnable terminal condition $\beta_t(s_t, a_t)$ 1718 may be defined on the actions that high-level agent 1706 takes at time t. In some aspects, $\beta_t(s_t, a_t) \in [0,1]$ can be defined as the probability of terminating action $a_t^h$. The goal of a hierarchical reinforcement agent is to learn both control action $a_t^h$ and termination condition $\beta_t$ for a given state such that lower-level agent takes better actions $a_t^l$ to get a higher reward from the environment. In addition, a critic neural network 1712 may be used, which provides a score value $V_{\theta_v}(s_t)$ to high-level and low-level policies (e.g., 1706 and 1708). Like the policy neural network, value function $V_{\theta_v}(s_t)$ is also composed of a separate neural network. In some embodiments, both value and policy functions may be trained at the same time with a reward from the environment. After training, the policy function may be considered for taking control actions.

Figure 18:
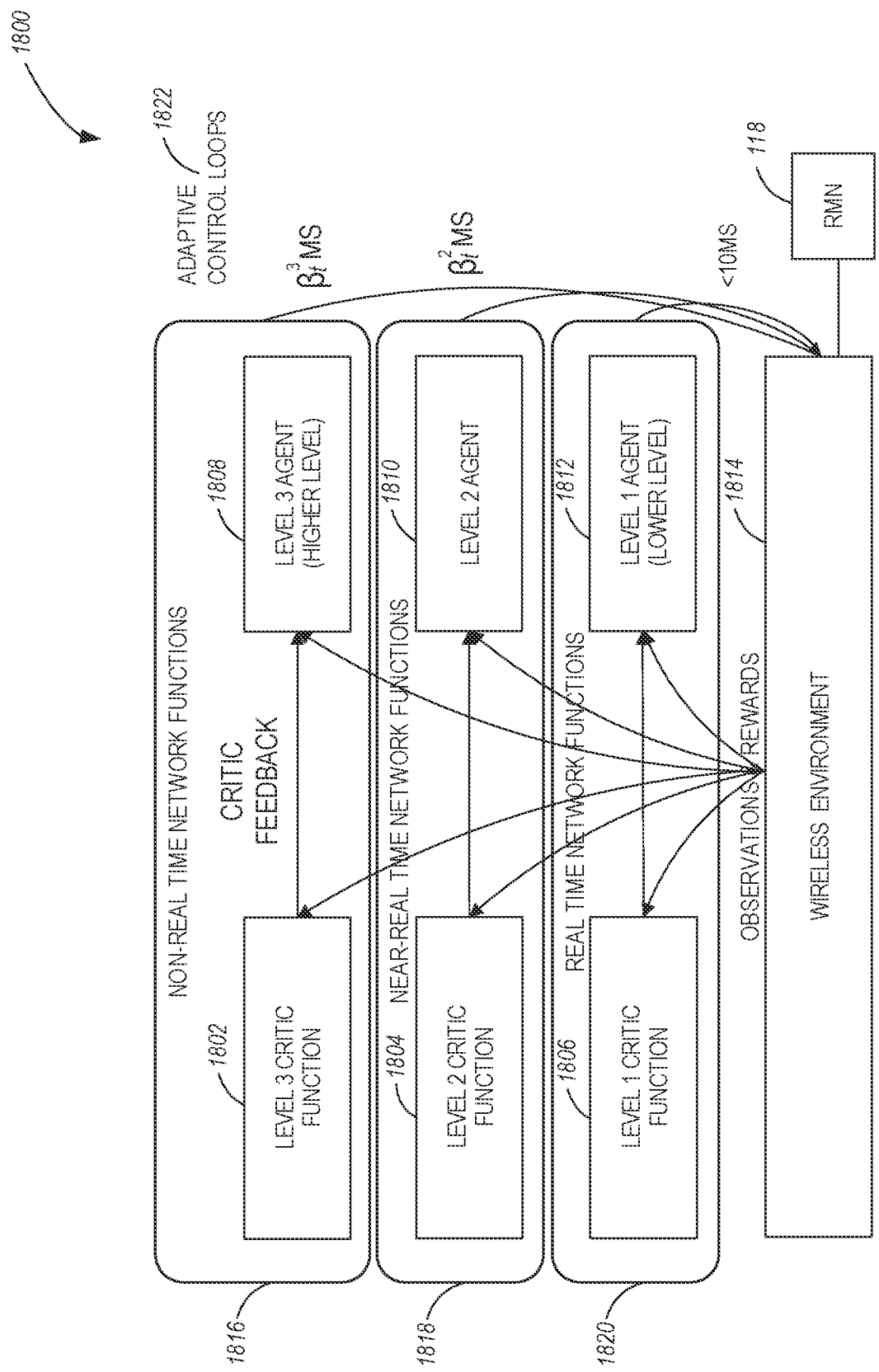
FIG. 18 illustrates a hierarchical temporal abstraction with a critic network for wireless networks, according to some embodiments.

In some embodiments, a hierarchical reinforcement learning model may be used for wireless networks as shown in FIG. 18. FIG. 18 illustrates a hierarchical temporal abstraction 1800 with a critic network for wireless networks, according to some embodiments. The hierarchical temporal abstraction 1800 includes non-RT network functions 1816, near-RT network functions 1818, and real-time network functions 1820, all in communication with RMN 118 in the wireless environment 1814.

The non-RT network functions 1816 include a level 3 critic function 1802 providing critic feedback to a level 3 agent (or higher-level agent) 1808. The near-RT network functions 1818 include a level 2 critic function 1804 providing critic feedback to level 2 agent 1810. The real-time network functions 1820 include a level 1 critic function 1806 providing critic feedback to a level 1 agent (or lower-level agent) 1812.

In the embodiment of FIG. 18, any network functions in each level of the control loops 1822 have a dedicated critic neural network which provides a value that is based on the observations and measurements from the channel and wireless network. These values are used to guide agents for faster training and better performance, making the wireless network more robust to outliers. After training, the critic neural network may be disabled, and policy functions in a hierarchical manner may be considered. In some aspects, the input of the critic neural network can be different from the policy neural network. Additionally, the same critic neural network can be used for multiple network functions including at different levels of hierarchy. In some embodiments, the critic network may be added to both MAC scheduling and handover management functions.

Hierarchical Generative Model of a Wireless Network

In some wireless network operations, an optimal behavior policy may be obtained from an optimization problem or direct expert knowledge about how to operate these functions may be used as well. However, obtaining expert data can be costly, challenging, and it may not be general enough to apply such data to new and unforeseen scenarios. Therefore, the disclosed techniques may use hierarchical policy learning with generative neural networks. This model captures the behavior/functions of a wireless network with a neural network. Then, the learned generative neural network is used to learn new network functions through reinforcement learning. Since the new network functionality is generated by incorporating exiting behavior policies, new network functions may be more resilient to new and unforeseen cases.

Figure 19:
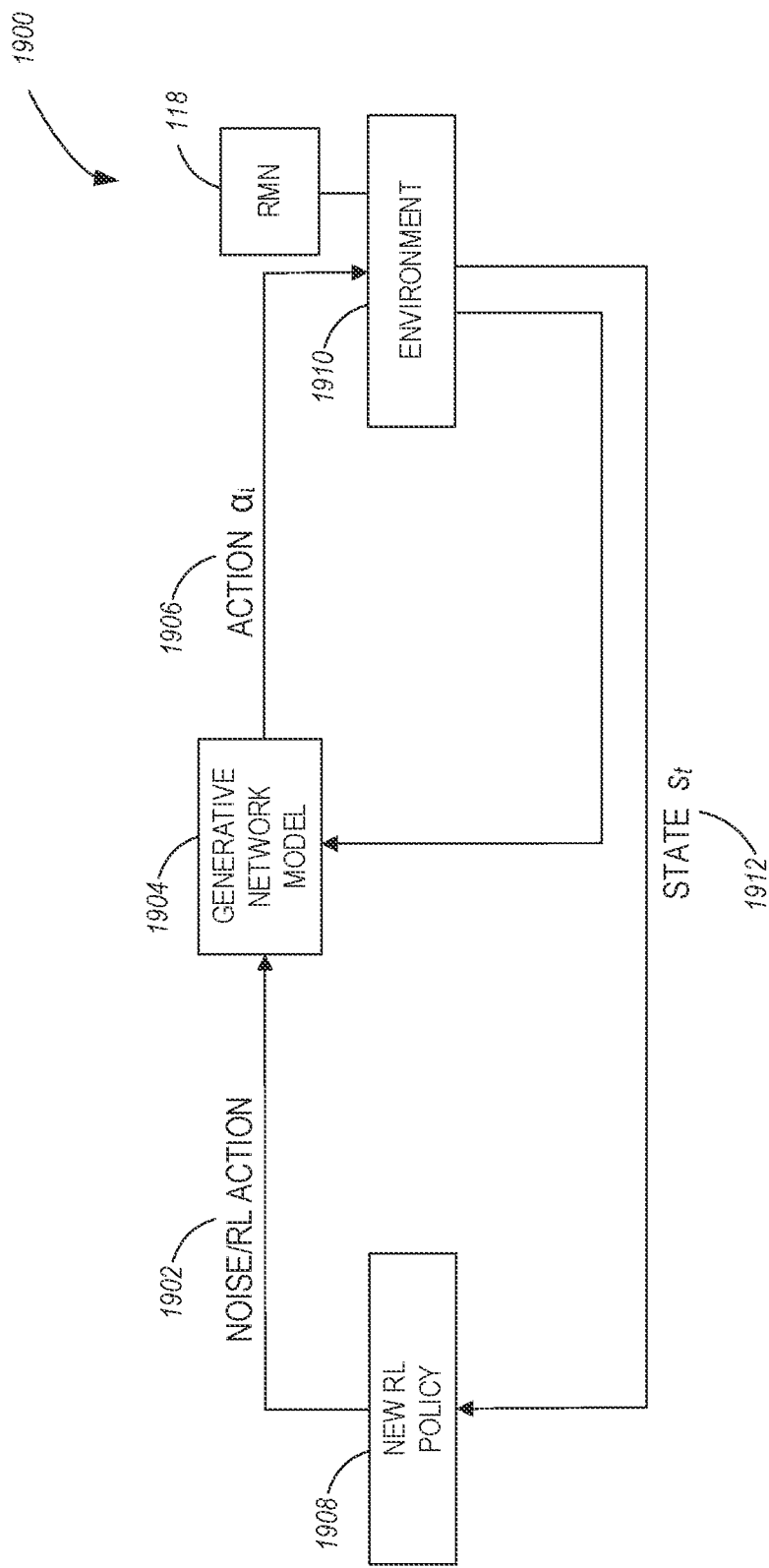
FIG. 19 illustrates a hierarchical generative model, according to some embodiments.

An example model description is given in FIG. 19. FIG. 19 illustrates a hierarchical generative model 1900, according to some embodiments. Referring to FIG. 19, the new RL policy 1908 generates noise/RL action 1902 for the generative network model 1904 based on state 1912 received from environment 1910 (e.g., from RMN 118). The generative network model 1904 generates action 1906 for environment 1910 based on state 1912 and noise/RL action 1902.

In the model of FIG. 19, a generative network model 1904 is used which takes optimal or close to optimal state-action pairs $(s_t, a_t^i)$ for the various task in the system as input (e.g., an optimal $(s_t, a_t^i, s_{t+1}, a_{t+1}^i, s_{t+2}, a_{t+2}^i, \ldots)$ is known). The first goal of generative neural network training is to find a mapping from a very high dimensional latent space to optimal actions. In other words, the generative network is trained such that the log-likelihood of observed actions is maximized. Then, the generative model is used to connect with a reinforcement learning agent as shown in FIG. 19. The new reinforcement learning agent (e.g., 1908) observes new environment states and learns a high dimensional input vector for a generative network as an action.

Figure 20:
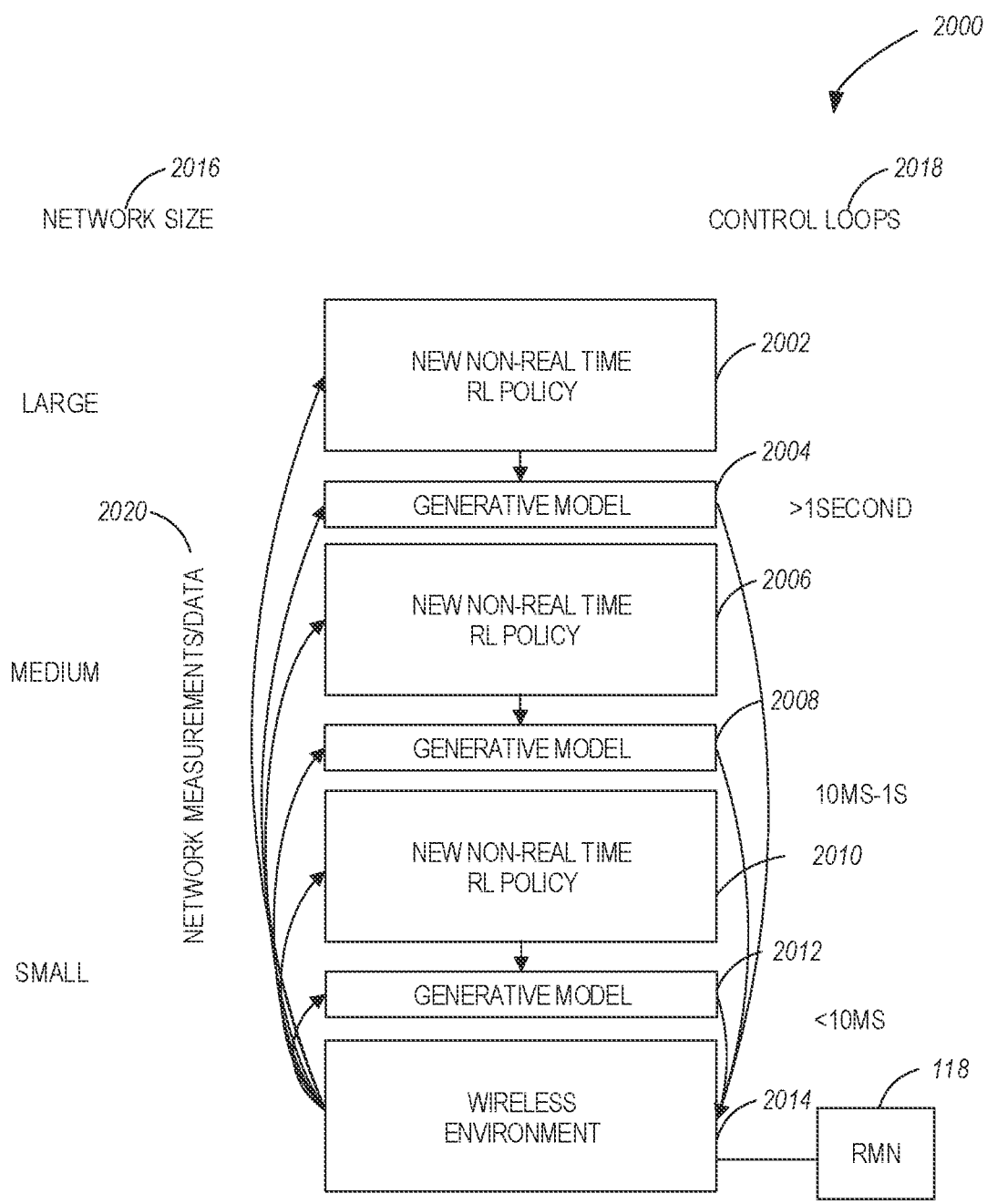
FIG. 20 illustrates a hierarchical generative model for wireless networks, according to some embodiments.

FIG. 20 illustrates a hierarchical generative model 2000 for wireless networks, according to some embodiments. Referring to FIG. 20, the hierarchical generative model 2000 can be configured by the RMN 118 of wireless environment 2014 and can include RL policies (e.g., new non-RT RL policies) 2002, 2006, and 2010, as well as generative models 2004, 2008, and 2012. The RL policies 2002, 2006, and 2010, as well as the generative models 2004, 2008, and 2012 may be associated with a network size 2016 and with different latencies of corresponding control loops 2018. The wireless environment 2014 may communicate network measurements/data 2020 to the RL policies and the generative models, and corresponding actions are communicated from the generative models to the wireless environment 2014 (e.g., to the RMN 118) based on corresponding latencies associated with the control loops 2018.

In some embodiments, the above hierarchical reinforcement learning model may be used as a wireless network model. In the wireless network, channel/network measurements are used as state input of the generative network model and the corresponding control signaling as actions to train the generative neural network. In some aspects, noise input may be considered as Gaussian noise. After training the generative model such that it maximizes the likelihood given by the control signal, a new policy is trained for the new task for which optimal control signaling and actions may not be available. Since the new tasks utilize tested and designed generative models, the new RL policy for the new task may result in a more robust and resilient network operation. The diagram of the proposed wireless network is provided in FIG. 20. In this case, a single network function given in FIG. 6 may be considered, and each function may be represented with both RL policy and a generative network model as illustrated in FIG. 20. Therefore, unlike previous embodiments, the hierarchy in FIG. 20 is not defined over multiple time scales. Instead, the hierarchy is defined within the same network function. However, multiple hierarchical generative models may be combined to form a multi-time scale solution.

Hierarchical Abstraction of a Wireless Network with Stochastic Neural Networks

In some aspects, wireless network functions may be modeled as a reinforcement learning agent which is composed of two-level hierarchical agents. In this model, a network function in a higher level provides a control signaling for a network function in a lower level such that all the functions within the same hierarchical flow jointly optimize given wireless network performance. The purpose of a high-level agent is to learn the control options of the low-level agent. Unlike existing models which have single or fixed control options of network functions, the proposed model brings different and new control options for the same functionality of the network. In some aspects, the proposed framework provides improved control, performance, and resiliency against failure events because higher-level agents may have more visibility about network status, as well as more control of the final goal (performance task).

Figure 21:
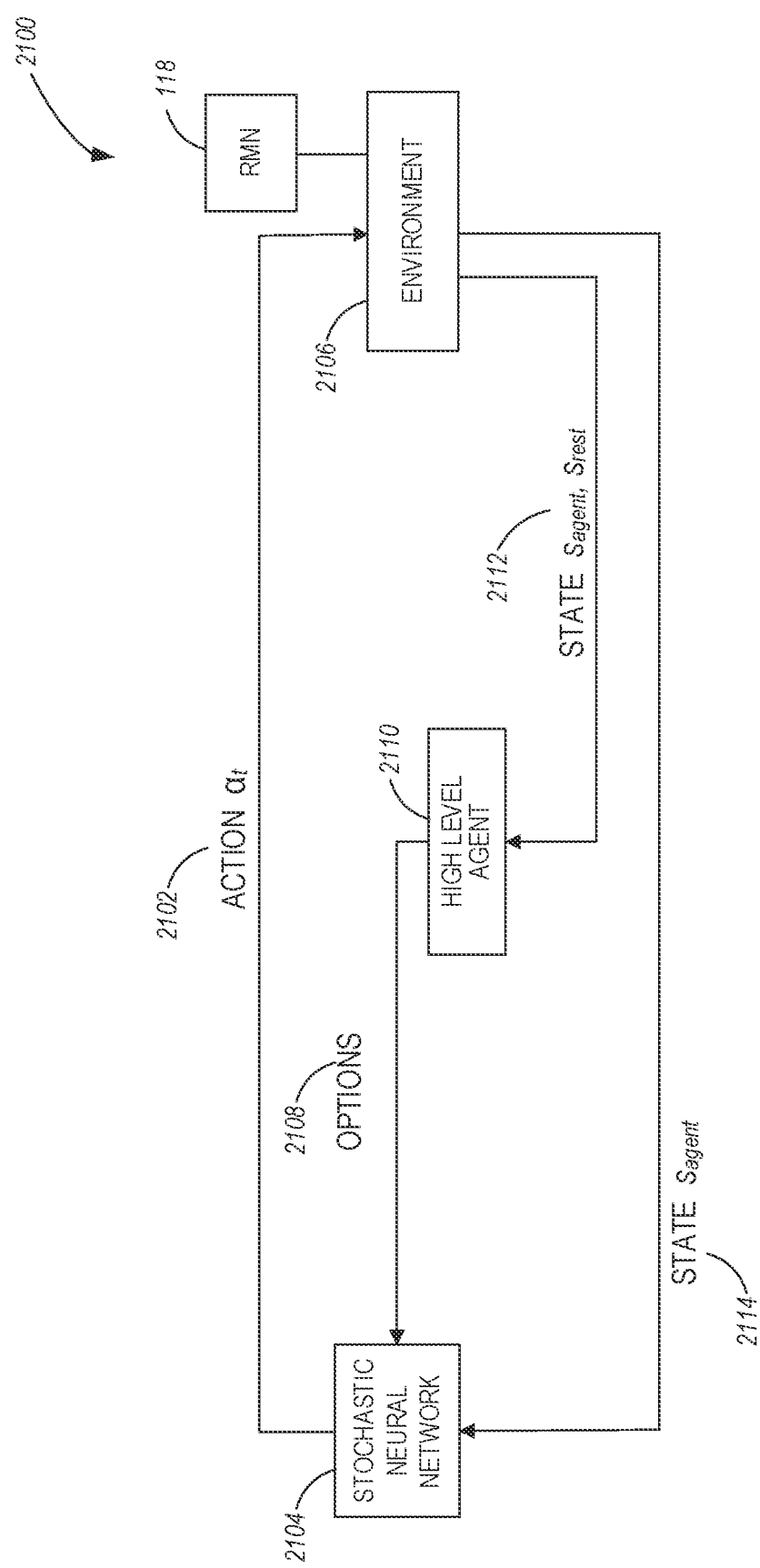
FIG. 21 illustrates a hierarchical reinforcement learning model with stochastic neural networks, according to some embodiments.

In some embodiments, two levels of hierarchical learning agents may be used as shown in FIG. 21. FIG. 21 illustrates a hierarchical reinforcement learning model 2100 with stochastic neural networks, according to some embodiments. Referring to FIG. 21, the stochastic neural network 2104 generates action 2102 for environment 2106 based on state 2114 received from the environment 2106 (e.g., from RMN 118) and options 2108 generated by the high-level agent 2110 based on state 2112.

As shown in FIG. 21, a higher-level agent acts upon a lower-level agent. In some aspects, an agent can be defined as either a policy function $\pi(a_t|s_{agent})$, or value function $Q(s_{agent}, a_t)$, where $s_{agent}$ is input state for stochastic neural network 2104 and $a_t$ is the action for environment 2106 at time index t. In this framework, a higher-level agent gets its state input $s_{agent}$ and any other state input $s_{rest}$, from the environment at every N time step t, and then selects an option for the lower level agent. The lower-level agent looks at its state input from the environment as well as option 2108 defined by its higher-level agent and then selects an action 2102 to act upon environment 2106 for the next N time steps. In some aspects, the structure of the low-level agent is a stochastic neural network which is a type of artificial neural network built by introducing random variations into the network. In other words, options selected by the high-level agent characterize some distribution function at the input or intermediate levels of the neural network. During the training phase of the reinforcement learning setting, both high-level agents and the stochastic neural network-based low-level agent are adapted based on the reward they receive from the environment. In summary, a higher-level agent learns how to control the lower-level agent and picks an option for the lower-level agent based on its state (channel and network observation/measurements). In some aspects, the lower level agent is responsible for taking atomic actions in the environment.

Figure 22:
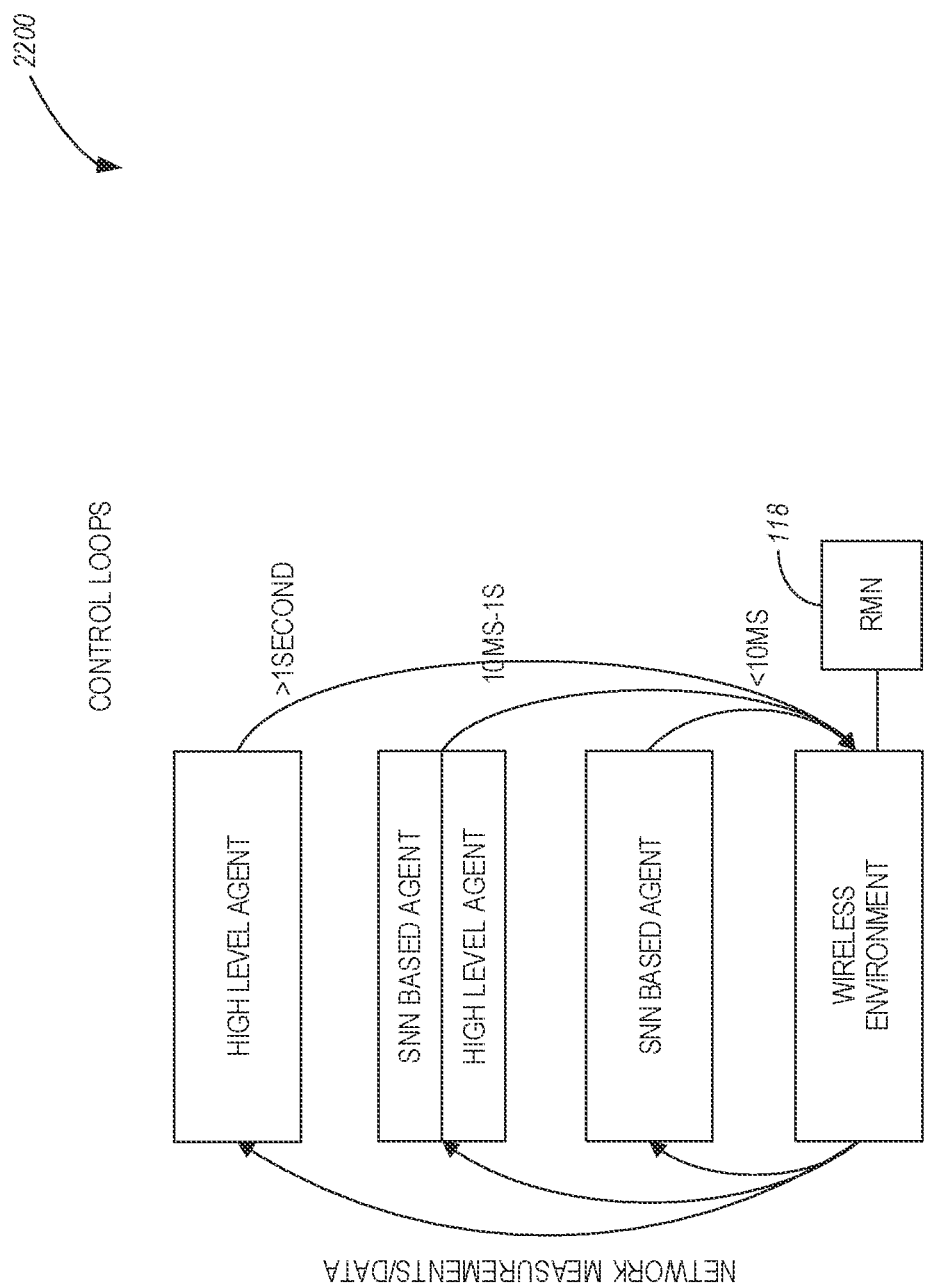
FIG. 22 and FIG. 23 illustrate hierarchical abstractions of a wireless network with stochastic neural networks, according to some embodiments.
Figure 23:
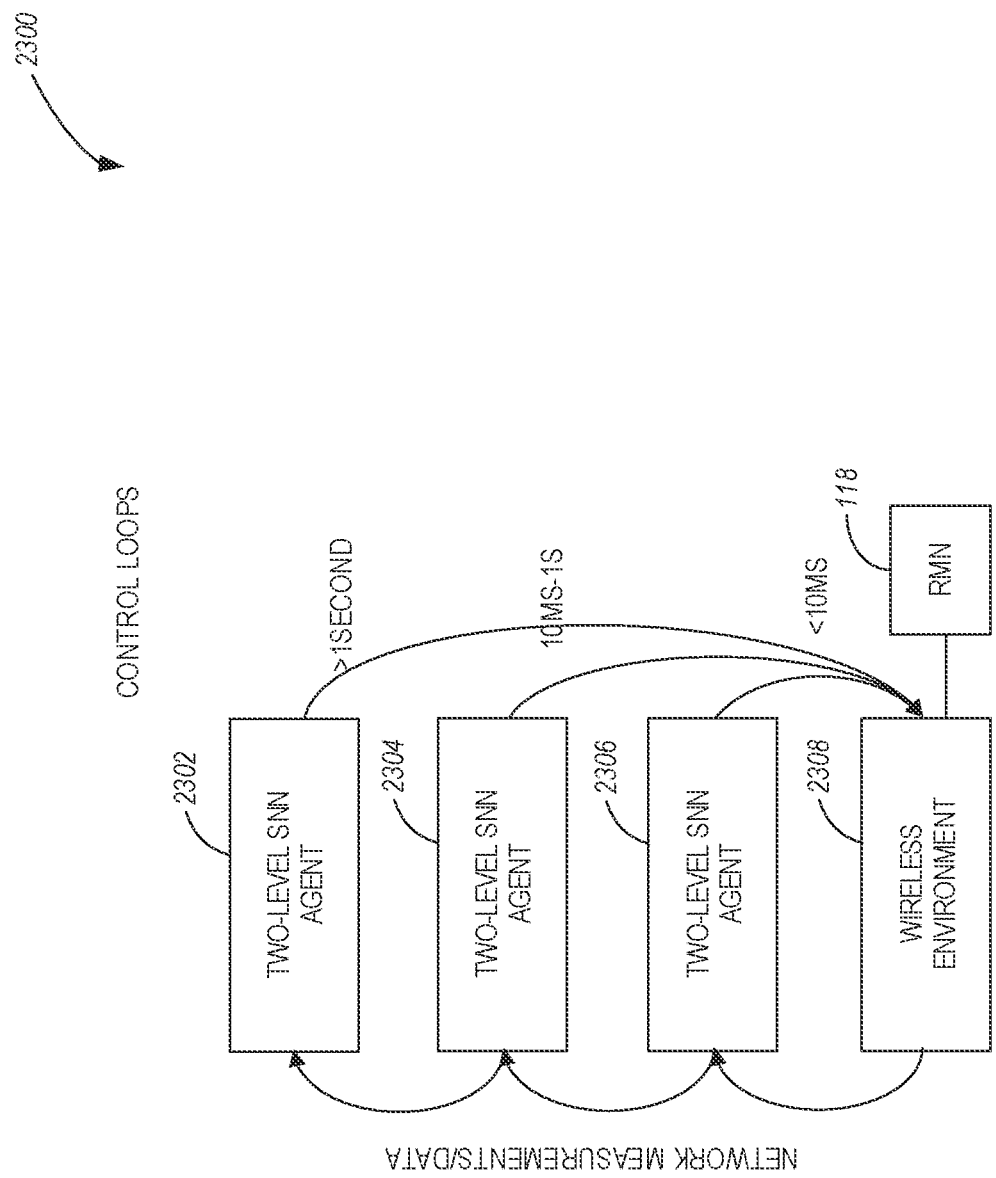

FIG. 22 and FIG. 23 illustrate hierarchical abstractions 2200 and 2300 of a wireless network with stochastic neural networks, according to some embodiments.

In some embodiments, hierarchical reinforcement learning may be modeled with stochastic neural networks in two ways. Based on a first way illustrated in FIG. 22, a high-level agent is considered as a network function at a slower control loop, and a low-level (stochastic neural network) SNN based agent is considered as a network function in a faster control loop. Based on a second way illustrated in FIG. 23, each function is considered in any control loop and is represented as a two-level SNN agent (e.g., 2302, 2304, 2306) in communication with the wireless environment 2308. In the last case, any functionality of a wireless network may be replaced with the above reinforcement learning framework. As discussed herein, the stochastic neural network agent with higher-level learnable options provides more control and resiliency to various unwanted and corner cases in the wireless network. For example, the carrier aggregation task in FIG. 6 can be considered for this embodiment. In the carrier aggregation task, cell CA configuration CCs allocation function, UE CA configuration and SCC set allocation and HO function, and CA aware UE scheduling and SCC allocation per UE function may be considered. In this regard, a high-level agent model may be designed for each function given above which controls a stochastic neural network to provide control input for a lower layer, or each function may be represented by both a high-level agent and a stochastic neural network at the same time (e.g., as illustrated in FIG. 22).

The above-described seven different hierarchical models may be used for training a neural network and to determine how to represent a wireless network functions over temporal and hierarchical ways. In some embodiments, a graph neural network architecture is illustrated in FIG. 24 may be used as a building block for the above reinforcement learning models.

Figure 24:
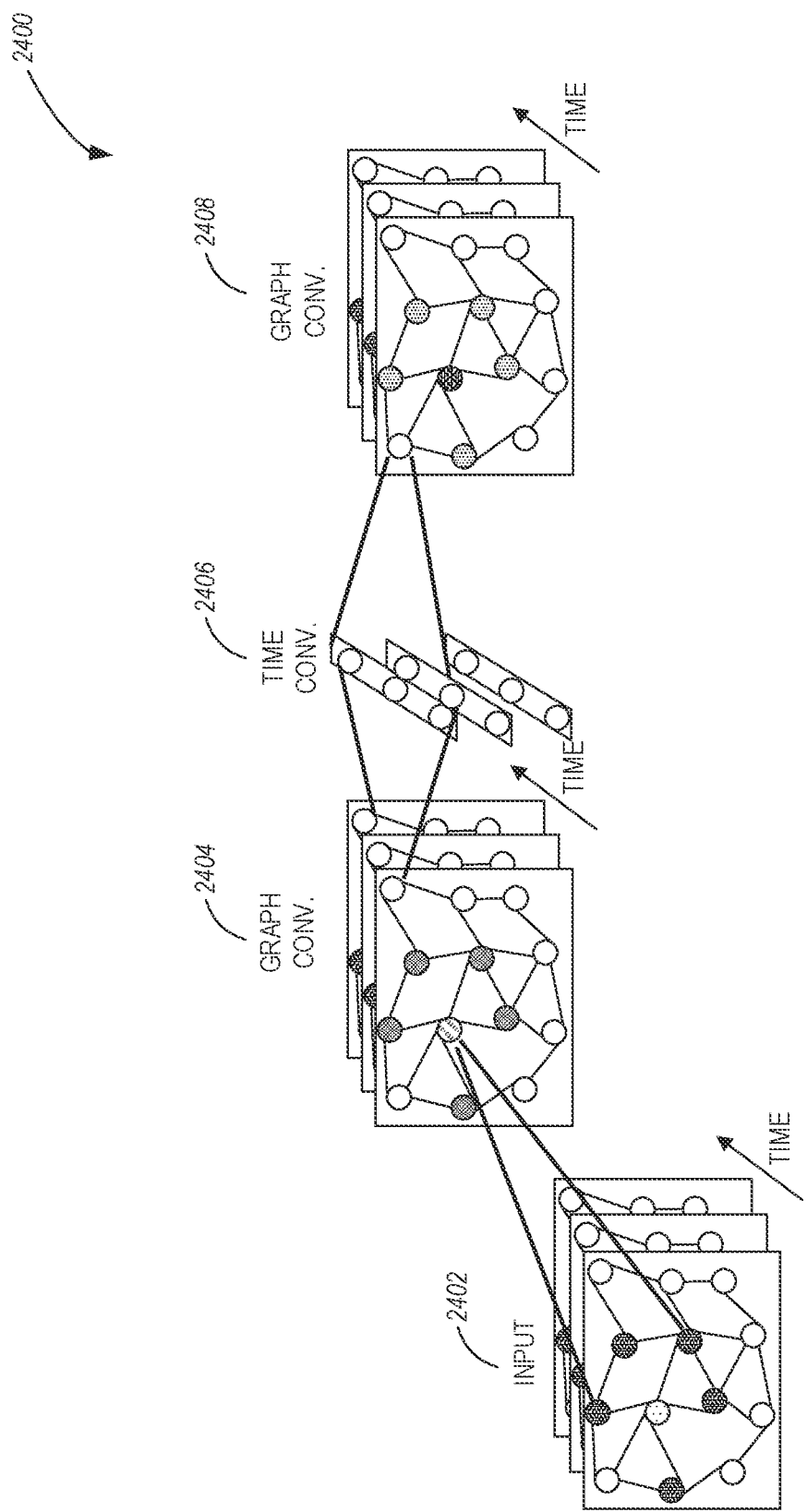
FIG. 24 illustrates a GNN architecture for wireless networks, according to some embodiments.

FIG. 24 illustrates a GNN architecture 2400 for wireless networks, according to some embodiments. Referring to FIG. 24, the GNN architecture 2400 may be configured to process an input 2402 using graph convolutions 2404 and 2408 as well as a time convolution 2406.

In some embodiments, the GNN architecture 2400 may be used as a framework to capture the dependence of nodes in graphs via message passing between the nodes. Unlike deep neural networks, a GNN may directly operate on a graph to represent information from its neighborhood with arbitrary hops. This makes GNN an appropriate tool to use for wireless networks which have complex features that cannot be captured in a closed-form. The disclosed techniques may use a GNN-based approach by incorporating the relationship between nodes illustrated in FIG. 4. To achieve intelligent and proactive wireless network management, the next generation network may be abstracted as a graph, in which all entities are represented by nodes, and the quality of the wireless links are given by the edge weights. The difference between uplink and downlink connectivity may be captured through directional links. To capture the network awareness, edge and node labels reflecting features, such as instantaneous channel and network measurements, channel quality, average UE rates, etc., may be considered and the proposed joint GNN-RL framework is applied to enable intelligent network decisions. In some aspects, the GNN formulation allows for extending existing network processing to distributed controlling of the network via the local processing nature of architectures. In this regard, parts of the network controller loops are distributed and other parts may be hierarchical.

Spatial-Temporal Graph Neural Networks Modeling of Wireless Networks

In some embodiments, next generation networks may include MEC/RICs, CUs, DUs, and UEs. In this disclosure, a wireless network including $N_{ric}$ MEC/RICs, $N_{cu}$ CUs, $N_{du}$ DUs, $N_{ue}$ UEs may be considered as a graph $\mathcal{G} = (\mathcal{E}, \mathcal{V})$. The set of nodes are $\mathcal{V} = \{v_0^{du}, \ldots, v_{N_{du}}^{du}, v_0^{cu}, \ldots, v_{N_{cu}}^{cu}, v_0^{ric}, \ldots, v_{N_{ric}}^{ric}, v_0^{ue}, \ldots, v_{N_{ue}}^{ue}\}$ with edges $\varepsilon = \{e_{v_i^a, v_j^b} | v_i^a \in \mathcal{V}^a, v_j^b \in \mathcal{V}^b\}$ where $a \in \{du, cu, ric, ue\}$, $b \in \{du, cu, ric, ue\}$, of $\mathcal{G}$ are wireless links between nodes in the network. Although some of the nodes are directly connected to higher-level nodes with tree structures, virtual edges between the nodes may be considered to convey information about their connectivity and local graph structure. For example, the virtual edges $\epsilon_{du} = \{e_{v_i^{du}, v_j^{du}} | v_i^{du}, v_j^{du} \in \mathcal{V}^{du}\}$ between two DUs can be defined according to Euclidean distance such that there is a link between the two DUs if the Euclidean distance between them is smaller than $d_{max}$. The same argument can be applied to the other nodes. In another embodiment, for every reported measurement for node pair $(v_i^a, v_j^a)$, $a \in \{du, cu, ric, ue\}$, we calculate a score function as $(S)_{v_i^a, v_j^a} = (S)_{v_i^a, v_j^a} + f(\text{some measurement for } v_i^a, \text{some measurement for } v_j^a)$, $(S)_{v_j^a, v_j^a} = (S)_{v_i^a, v_j^a}$, where $f(a,b) = 1$ or $$f(a, b) = 10^{\frac{-|a-b|}{10}}.$$

Then, node to node adjacency may be identified based on a threshold periodically.

Based on the connectivity graph and virtual graphs defined above (depicted in FIG. 24), adjacency matrixes $A_{a,b} \in \{0,1\}^{|\mathcal{V}| \times |\mathcal{V}|}$, $a \in \{du, cu, ric, ue\}$, $b \in \{du, cu, ric, ue\}$ may be defined for the graphs between different entities of the network as follows:

$$A_{a,b}(i, j) = \begin{cases} 1 & \text{if } e_{v_i^a, v_j^b} \in \varepsilon \\ 0 & o.w. \end{cases}.$$

The initial nodal features may be defined as $X_a^{(0)}$ for $a \in \{du, cu, ric, ue\}$. The initial nodal features can be reported as channel/network measurements as given in Table 1, or any other functions related to network problem of interest. The L-layer GNN architecture may be defined as follows: $Z_a^l = \Sigma_{\forall b} \Sigma_{k=0}^{K} A_{a,b} X_b^{(l)} W_b^{l,k}$, $\forall a$, and $X_a^{(l)} = \sigma(Z_a^l)$, $\forall a$, where K is the number of diffusion steps over the network/graph, $W_b^{l,k}$ is the neural network weights, and $\sigma(\cdot)$ is the activation function. In some aspects, the convolution operation defined above falls into a spatial operation.

In some aspects, a temporal operation as follows may be used between layers of the GNN architecture 2400 in FIG. 24. The temporal operation may be useful to extract temporal correlation between features of the wireless network. The temporal neural network convolution can be defined as follows: $X_a^{(l)} \leftarrow \sigma(\Sigma_{u=0}^{U} f(u) X_a^{(l)}(t-u))$, where $f(\cdot)$ is a filter of size U.

Figure 25:
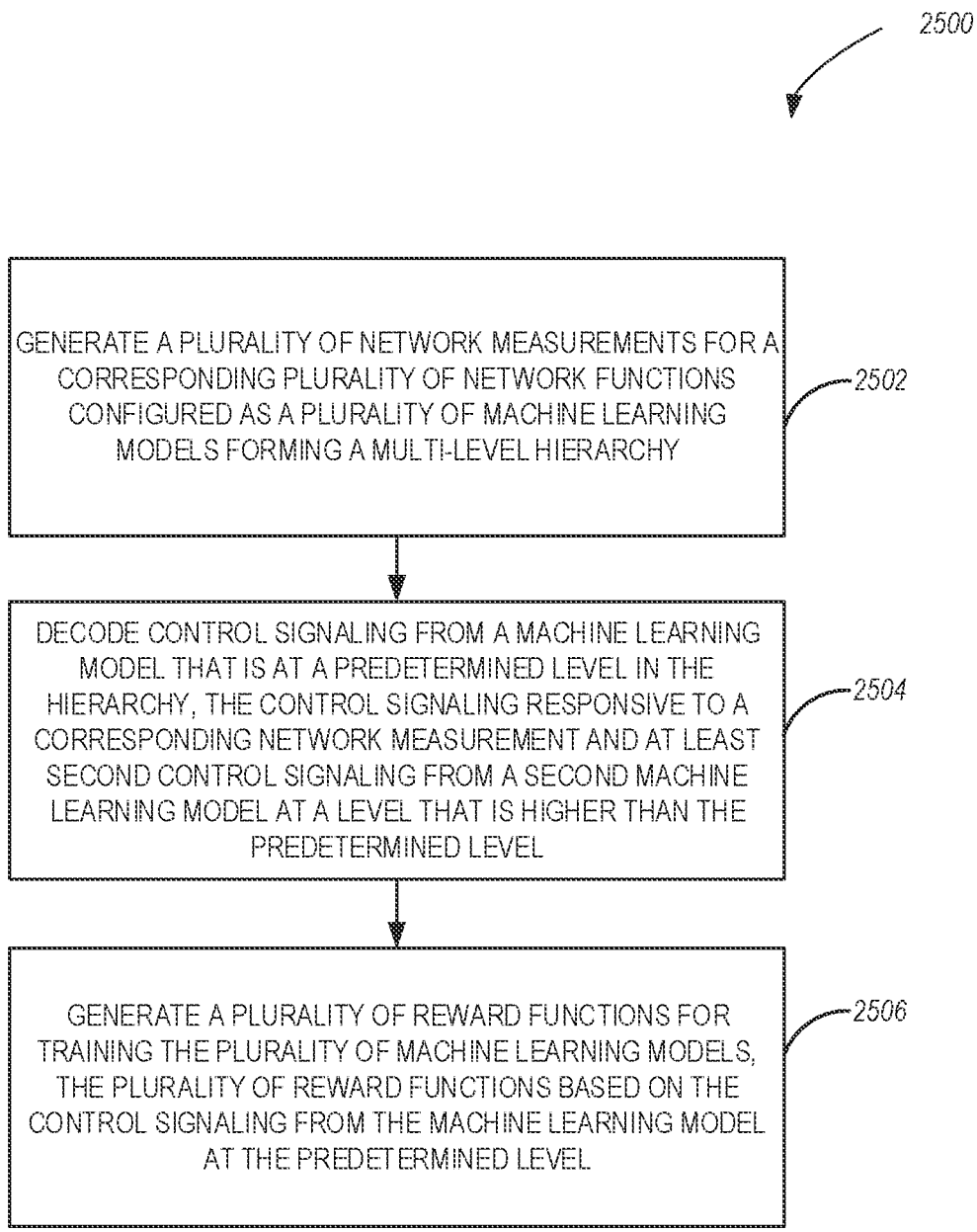
FIG. 25 illustrates a flow diagram of a method for RL and GNN-based resource management, in accordance with some embodiments.

FIG. 25 illustrates a flow diagram of a method 2500 for RL and GNN-based resource management, in accordance with some embodiments. Referring to FIG. 25, method 2500 includes operations 2502, 2504, and 2506, which may be executed by the RMN 118 or another network node of a wireless access network.

At operation 2502, a plurality of network measurements for a corresponding plurality of network functions of the NG wireless network is generated. For example and about FIG. 8, the RMN 118 generates the plurality of network measurements as the states 814 and 816. The plurality of network functions may be configured as a plurality of machine learning models forming a multi-level hierarchy (e.g., as illustrated in FIG. 9).

At operation 2504, control signaling from a machine learning model of the plurality of machine learning models that is at a predetermined level (e.g., a lowest level) in the multi-level hierarchy is received and decoded. For example, the RMN 118 of the wireless environment 908 receives control signaling (e.g., action 916 or 804) from the ML model (e.g., lower level agent 906 or 808) that is at the predetermined level in the hierarchy. In some embodiments, the control signaling (e.g., action 804) is responsive to a corresponding network measurement (e.g., state 816) of the plurality of network measurements and at least second control signaling (e.g., goal 802) from a second machine learning model (e.g., high-level agent 806) at a level that is higher than the predetermined level (e.g., the level of the low-level agent 808).

At operation 2506, a plurality of reward functions for training the plurality of machine learning models is generated. For example, the RMN 118 may generate rewards 818 and 812. The plurality of reward functions is based on the control signaling (e.g., action 804) from the machine learning model at the predetermined level in the multi-level hierarchy.

Figure 26:
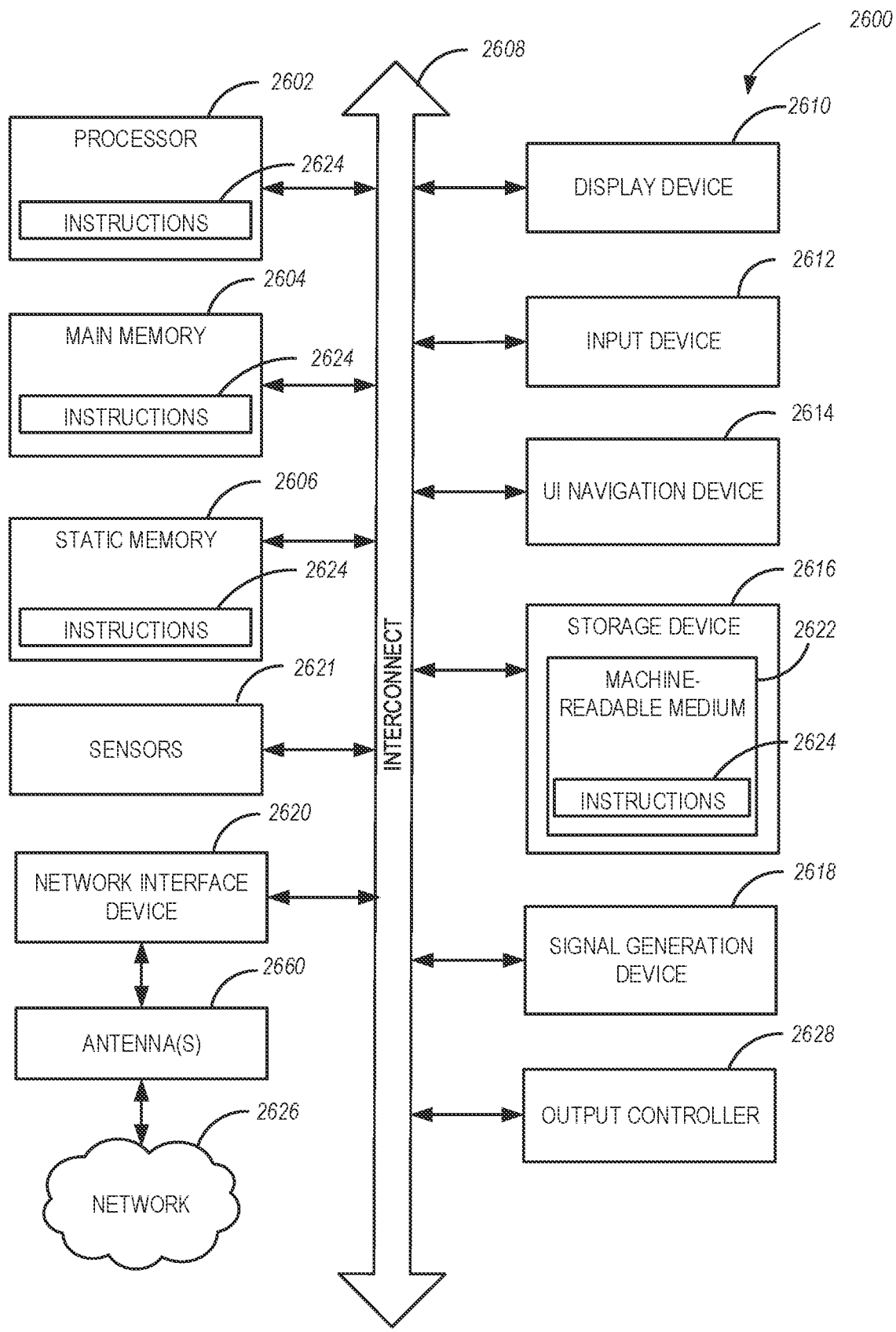
FIG. 26 illustrates a block diagram of an example machine upon which any one or more of the operations/techniques (e.g., methodologies) discussed herein may perform.

FIG. 26 illustrates a block diagram of an example machine 2600 upon which any one or more of the techniques (e.g., methodologies) discussed herein may perform. In alternative embodiments, the machine 2600 may operate as a standalone device or may be connected (e.g., networked) to other machines. In a networked deployment, machine 2600 may operate in the capacity of a server machine, a client machine, or both in server-client network environments. In an example, the machine 2600 may act as a peer machine in a peer-to-peer (P2P) (or other distributed) network environment. The machine 2600 may be a personal computer (PC), a tablet PC, a set-top box (STB), a personal digital assistant (PDA), a portable communications device, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 2600 may include a hardware processor 2602 (e.g., a central processing unit (CPU), a graphics processing unit (GPU), a hardware processor core, or any combination thereof), a main memory 2604, and a static memory 2606, some or all of which may communicate with each other via an interlink (e.g., bus) 2608.

Specific examples of main memory 2604 include Random Access Memory (RAM), and semiconductor memory devices, which may include, in some embodiments, storage locations in semiconductors such as registers. Specific examples of static memory 2606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

Machine 2600 may further include a display device 2610, an input device 2612 (e.g., a keyboard), and a user interface (UI) navigation device 2614 (e.g., a mouse). In an example, the display device 2610, input device 2612, and UI navigation device 2614 may be a touch screen display. The machine 2600 may additionally include a storage device (e.g., drive unit or another mass storage device) 2616, a signal generation device 2618 (e.g., a speaker), a network interface device 2620, and one or more sensors 2621, such as a global positioning system (GPS) sensor, compass, accelerometer, or other sensors. The machine 2600 may include an output controller 2628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments, the processor 2602 and/or instructions 2624 may comprise processing circuitry and/or transceiver circuitry.

The storage device 2616 may include a machine-readable medium 2622 on which is stored one or more sets of data structures or instructions 2624 (e.g., software) embodying or utilized by any one or more of the techniques or functions described herein. The instructions 2624 may also reside, completely or at least partially, within the main memory 2604, within static memory 2606, or within the hardware processor 2602 during execution thereof by the machine 2600. In an example, one or any combination of the hardware processor 2602, the main memory 2604, the static memory 2606, or the storage device 2616 may constitute machine-readable media.

Specific examples of machine-readable media may include non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine-readable medium 2622 is illustrated as a single medium, the term "machine-readable medium" may include a single medium or multiple media (e.g., a centralized or distributed database, and/or associated caches and servers) configured to store one or more instructions 2624.

An apparatus of the machine 2600 may be one or more of a hardware processor 2602 (e.g., a central processing unit (CPU), a graphics processing unit (GPU), a hardware processor core, or any combination thereof), a main memory 2604 and a static memory 2606, one or more sensors 2621, a network interface device 2620, antennas 2660, a display device 2610, an input device 2612, a UI navigation device 2614, a storage device 2616, instructions 2624, a signal generation device 2618, and an output controller 2628. The apparatus may be configured to perform one or more of the methods and/or operations disclosed herein. The apparatus may be intended as a component of the machine 2600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine-readable medium" may include any medium that is capable of storing, encoding, or carrying instructions for execution by the machine 2600 and that cause the machine 2600 to perform any one or more of the techniques of the present disclosure, or that is capable of storing, encoding or carrying data structures used by or associated with such instructions. Non-limiting machine-readable medium examples may include solid-state memories and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks, magneto-optical disks; Random Access Memory (RAM); and CD-ROM and DVD-ROM disks. In some examples, machine-readable media may include non-transitory machine-readable media. In some examples, machine-readable media may include machine-readable media that is not a transitory propagating signal.

The instructions 2624 may further be transmitted or received over a communications network 2626 using a transmission medium via the network interface device 2620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 2620 may include one or more physical jacks (e.g., Ethernet, coaxial, or phone jacks) or one or more antennas to connect to the communications network 2626. In an example, the network interface device 2620 may include one or more antennas 2660 to wirelessly communicate using at least one single-input multiple-output (SIMO), multiple-input multiple-output (MIMO), or multiple-input single-output (MISO) techniques. In some examples, the network interface device 2620 may wirelessly communicate using Multiple User MIMO techniques. The term "transmission medium" shall be taken to include any intangible medium that is capable of storing, encoding, or carrying instructions for execution by the machine 2600, and includes digital or analog communications signals or other intangible media to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or concerning external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; flash memory, etc.

The above-detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof) or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect.

Antennas referred to herein may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

ADDITIONAL NOTES AND EXAMPLES

Example 1 is a computing node to implement a reinforcement learning management entity in a Next Generation (NG) wireless network, the node comprising: a network interface card (NIC); and processing circuitry coupled to the NIC, the processing circuitry configured to: generate a plurality of network measurements for a corresponding plurality of network functions of the NG wireless network, the plurality of network functions configured as a plurality of machine learning models forming a multi-level hierarchy; decode control signaling from a machine learning model of the plurality of machine learning models that is at a lowest level in the multi-level hierarchy, the control signaling responsive to a corresponding network measurement of the plurality of network measurements and at least second control signaling from a second machine learning model at a level that is higher than the lowest level; and generate a plurality of reward functions for training the plurality of machine learning models, the plurality of reward functions based on the control signaling from the machine learning model at the lowest level in the multi-level hierarchy.

In Example 2, the subject matter of Example 1 includes, wherein each of the plurality of network functions is associated with a control loop of a plurality of control loops.

In Example 3, the subject matter of Example 2 includes, wherein the plurality of control loops comprises: a non-real-time control loop associated with a non-real-time radio access network (RAN) intelligent controller (non-RT RIC); a near-real-time (near-RT) control loop associated with a near-RT RIC; and a real-time (RT) control loop associated with a RIC.

In Example 4, the subject matter of Example 3 includes, wherein the plurality of network functions comprises: at least one non-RT network function associated with the non-RT RIC, the at least one non-RT network function comprising: a cell beam coordination network function; an interference coordination network function; a carrier aggregation configuration network function; a data radio bearer (DRB) configuration and mapping network function; or a cell decision and net topology configuration network function.

In Example 5, the subject matter of Example 4 includes, wherein the plurality of network functions comprises: at least one near-RT network function associated with the near-RT RIC, the at least one near-RT network function comprising: a quality of service (QoS) priority handling network function; a connection and mobility management network function; a carrier aggregation configuration network function; a multi-connectivity configuration network function; a packet duplication network function; a packet steering network function; or semi-persistent scheduling configuration network function.

In Example 6, the subject matter of Example 5 includes, wherein the plurality of network functions comprises: at least one RT network function associated with the RIC, the at least one RT network function comprising: a media access control (MAC) scheduling network function; a beam or power allocation network function; or a user equipment (UE) scheduling network function.

In Example 7, the subject matter of Examples 3-6 includes, wherein the plurality of machine learning models are arranged in the multi-level hierarchy based on a time scale associated with each of the plurality of control loops.

In Example 8, the subject matter of Examples 1-7 includes, wherein each machine learning model of the plurality of machine learning models that is between a highest level and the lowest level in the multi-level hierarchy is configured to generate a control signaling goal for a neighboring machine learning model at a lower level in the multi-level hierarchy.

In Example 9, the subject matter of Examples 1-8 includes, wherein each of the plurality of machine learning models is configured with a plurality of network policies, and wherein the processing circuitry is configured to generate the plurality of reward functions based on at least one combined network policy using the plurality of network policies.

In Example 10, the subject matter of Examples 1-9 includes, wherein the processing circuitry is configured to decode the control signaling from the machine learning model of the plurality of machine learning models that is at the predetermined level in the multi-level hierarchy, the control signaling further based on a probability of a network action corresponding to the at least second control signaling.

In Example 11, the subject matter of Examples 1-10 includes, wherein each machine learning model of the plurality of machine learning models further includes a critic neural network, and wherein the control signaling from the machine learning model is further based on feedback generated by the critic neural network, the feedback indicative of a measurement on a communication channel of the NG wireless network.

Example 12 is at least one non-transitory machine-readable storage medium comprising instructions stored thereupon, which when executed by processing circuitry of a computing node operable to implement a reinforcement learning management entity in a Next Generation (NG) wireless network, cause the processing circuitry to perform operations comprising: generating a plurality of network measurements for a corresponding plurality of network functions of the NG wireless network, the plurality of network functions configured as a plurality of machine learning models forming a multi-level hierarchy; decoding control signaling from a machine learning model of the plurality of machine learning models that is at a predetermined (e.g., lowest) level in the multi-level hierarchy, the control signaling responsive to a corresponding network measurement of the plurality of network measurements and at least second control signaling from a second machine learning model at a level that is higher than the predetermined level; and generating a plurality of reward functions for training the plurality of machine learning models, the plurality of reward functions based on the control signaling from the machine learning model at the predetermined level in the multi-level hierarchy.

In Example 13, the subject matter of Example 12 includes, wherein each of the plurality of network functions is associated with a control loop of a plurality of control loops, and wherein the plurality of control loops comprises a non-real-time control loop associated with a non-real-time (non-RT) radio access network (RAN) intelligent controller (RIC); a near-real-time (near-RT) control loop associated with a near-RT RIC; and a real-time (RT) control loop associated with a RIC.

In Example 14, the subject matter of Example 13 includes, wherein the plurality of machine learning models are arranged in the multi-level hierarchy based on a time scale associated with each of the plurality of control loops.

In Example 15, the subject matter of Examples 12-14 includes, wherein each machine learning model of the plurality of machine learning models that is between a highest level and the predetermined level in the multi-level hierarchy is configured to generate a control signaling goal for a neighboring machine learning model at a lower level in the multi-level hierarchy.

In Example 16, the subject matter of Examples 12-15 includes, wherein each of the plurality of machine learning models is configured with a plurality of network policies, and wherein the processing circuitry further performs operations comprising: generating the plurality of reward functions based on at least one combined network policy using the plurality of network policies.

In Example 17, the subject matter of Examples 12-16 includes, wherein the processing circuitry further perform operations comprising: decoding the control signaling from the machine learning model of the plurality of machine learning models that is at the predetermined (e.g., lowest) level in the multi-level hierarchy, the control signaling further based on a probability of a network action corresponding to the at least second control signaling.

In Example 18, the subject matter of Examples 12-17 includes, wherein each machine learning model of the plurality of machine learning models further includes a critic neural network, and wherein the control signaling from the machine learning model is further based on feedback generated by the critic neural network, the feedback indicative of a measurement on a communication channel of the NG wireless network.

Example 19 is a computing node to implement a reinforcement learning management entity in a Next Generation (NG) wireless network, the node comprising: means for generating a plurality of network measurements for a corresponding plurality of network functions of the NG wireless network, the plurality of network functions configured as a plurality of machine learning models forming a multi-level hierarchy; means for decoding control signaling from a machine learning model of the plurality of machine learning models that is at a predetermined level (e.g., lowest level) in the multi-level hierarchy, the control signaling responsive to a corresponding network measurement of the plurality of network measurements and at least second control signaling from a second machine learning model at a level that is higher than the predetermined level; and means for generating a plurality of reward functions for training the plurality of machine learning models, the plurality of reward functions based on the control signaling from the machine learning model at the predetermined level in the multi-level hierarchy.

In Example 20, the subject matter of Example 19 includes, wherein each of the plurality of network functions is associated with a control loop of a plurality of control loops, and wherein the plurality of control loops comprises a non-real-time control loop associated with a non-real-time (non-RT) radio access network (RAN) intelligent controller (RIC); a near-real-time (near-RT) control loop associated with a near-RT RIC; and a real-time (RT) control loop associated with a RIC.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined regarding the appended claims, along with the full scope of equivalents to which such claims are entitled.

What is claimed is:

1. A computing node to implement a reinforcement learning management entity in a Next Generation (NG) wireless network, the node comprising:
a network interface card (NIC); and
processing circuitry coupled to the NIC, the processing circuitry configured to:
generate a plurality of network measurements for a corresponding plurality of network functions of the NG wireless network, the plurality of network functions configured as a plurality of machine learning models forming a multi-level hierarchy;
decode control signaling from a machine learning model of the plurality of machine learning models that is at a predetermined level in the multi-level hierarchy, the control signaling responsive to a corresponding network measurement of the plurality of network measurements and at least second control signaling from a second machine learning model at a level that is higher than the predetermined level; and
generate a plurality of reward functions for training the plurality of machine learning models, the plurality of reward functions based on the control signaling from the machine learning model at the predetermined level in the multi-level hierarchy.

2. The computing node of claim 1, wherein each of the plurality of network functions is associated with a control loop of a plurality of control loops.

3. The computing node of claim 2, wherein the plurality of control loops comprises:
a non-real-time control loop associated with a non-real-time radio access network (RAN) intelligent controller (non-RT RIC);
a near-real-time (near-RT) control loop associated with a near-RT RIC; and
a real-time (RT) control loop associated with a RIC.

4. The computing node of claim 3, wherein the plurality of network functions comprises:
at least one non-RT network function associated with the non-RT RIC, the at least one non-RT network function comprising:
a cell beam coordination network function;
an interference coordination network function;
a carrier aggregation configuration network function;
a data radio bearer (DRB) configuration and mapping network function; or
a cell decision and net topology configuration network function.

5. The computing node of claim 4, wherein the plurality of network functions comprises:
at least one near-RT network function associated with the near-RT RIC, the at least one near-RT network function comprising:
a quality of service (QoS) priority handling network function;
a connection and mobility management network function;
a carrier aggregation configuration network function;
a multi-connectivity configuration network function;
a packet duplication network function;
a packet steering network function; or
semi-persistent scheduling configuration network function.

6. The computing node of claim 5, wherein the plurality of network functions comprises:
at least one RT network function associated with the RIC, the at least one RT network function comprising:
a media access control (MAC) scheduling network function;
a beam or power allocation network function; or
a user equipment (UE) scheduling network function.

7. The computing node of claim 3, wherein the plurality of machine learning models are arranged in the multi-level hierarchy based on a time scale associated with each of the plurality of control loops.

8. The computing node of claim 1, wherein each machine learning model of the plurality of machine learning models that is between a highest level and a lowest level associated with the predetermined level in the multi-level hierarchy is configured to generate a control signaling goal for a neighboring machine learning model at a lower level in the multi-level hierarchy.

9. The computing node of claim 1, wherein each of the plurality of machine learning models is configured with a plurality of network policies, and wherein the processing circuitry is configured to:
generate the plurality of reward functions based on at least one combined network policy using the plurality of network policies.

10. The computing node of claim 1, wherein the processing circuitry is configured to:
decode the control signaling from the machine learning model of the plurality of machine learning models that is at the predetermined level in the multi-level hierarchy, the control signaling further based on a probability of a network action corresponding to the at least second control signaling.

11. The computing node of claim 1, wherein each machine learning model of the plurality of machine learning models further includes a critic neural network, and wherein the control signaling from the machine learning model is further based on feedback generated by the critic neural network, the feedback indicative of a measurement on a communication channel of the NG wireless network.

12. At least one non-transitory machine-readable storage medium comprising instructions stored thereupon, which when executed by processing circuitry of a computing node operable to implement a reinforcement learning management entity in a Next Generation (NG) wireless network, cause the processing circuitry to perform operations comprising:
generating a plurality of network measurements for a corresponding plurality of network functions of the NG wireless network, the plurality of network functions configured as a plurality of machine learning models forming a multi-level hierarchy;
decoding control signaling from a machine learning model of the plurality of machine learning models that is at a predetermined level in the multi-level hierarchy, the control signaling responsive to a corresponding network measurement of the plurality of network measurements and at least second control signaling from a second machine learning model at a level that is higher than the predetermined level; and
generating a plurality of reward functions for training the plurality of machine learning models, the plurality of reward functions based on the control signaling from the machine learning model at the predetermined level in the multi-level hierarchy.

13. The machine-readable storage medium of claim 12, wherein each of the plurality of network functions is associated with a control loop of a plurality of control loops, and wherein the plurality of control loops comprises:
- a non-real-time control loop associated with a non-real-time (non-RT) radio access network (RAN) intelligent controller (RIC);
- a near-real-time (near-RT) control loop associated with a near-RT RIC; and
- a real-time (RT) control loop associated with a RIC.

14. The machine-readable storage medium of claim 13, wherein the plurality of machine learning models are arranged in the multi-level hierarchy based on a time scale associated with each of the plurality of control loops.

15. The machine-readable storage medium of claim 12, wherein each machine learning model of the plurality of machine learning models that is between a highest level and the predetermined level in the multi-level hierarchy is configured to generate a control signaling goal for a neighboring machine learning model at a lower level in the multi-level hierarchy.

16. The machine-readable storage medium of claim 12, wherein each of the plurality of machine learning models is configured with a plurality of network policies, and wherein the processing circuitry further performs operations comprising:
- generating the plurality of reward functions based on at least one combined network policy using the plurality of network policies.

17. The machine-readable storage medium of claim 12, wherein the processing circuitry further performs operations comprising:
- decoding the control signaling from the machine learning model of the plurality of machine learning models that is at the predetermined level in the multi-level hierarchy, the control signaling is further based on a probability of a network action corresponding to the at least second control signaling.

18. The machine-readable storage medium of claim 12, wherein each machine learning model of the plurality of machine learning models further includes a critic neural network, and wherein the control signaling from the machine learning model is further based on feedback generated by the critic neural network, the feedback indicative of a measurement on a communication channel of the NG wireless network.

19. A computing node to implement a reinforcement learning management entity in a Next Generation (NG) wireless network, the node comprising:
- means for generating a plurality of network measurements for a corresponding plurality of network functions of the NG wireless network, the plurality of network functions configured as a plurality of machine learning models forming a multi-level hierarchy;
- means for decoding control signaling from a machine learning model of the plurality of machine learning models that is at a predetermined level in the multi-level hierarchy, the control signaling responsive to a corresponding network measurement of the plurality of network measurements and at least second control signaling from a second machine learning model at a level that is higher than the predetermined level; and
- means for generating a plurality of reward functions for training the plurality of machine learning models, the plurality of reward functions based on the control signaling from the machine learning model at the predetermined level in the multi-level hierarchy.

20. The computing node of claim 19, wherein each of the plurality of network functions is associated with a control loop of a plurality of control loops, and wherein the plurality of control loops comprises:
- a non-real-time control loop associated with a non-real-time (non-RT) radio access network (RAN) intelligent controller (RIC);
- a near-real-time (near-RT) control loop associated with a near-RT RIC; and
- a real-time (RT) control loop associated with a RIC.

\* \* \* \* \*